US007129954B2

(12) United States Patent
Sekine et al.

(10) Patent No.: US 7,129,954 B2
(45) Date of Patent: Oct. 31, 2006

(54) APPARATUS AND METHOD FOR SYNTHESIZING MULTI-DIMENSIONAL TEXTURE

(75) Inventors: Masahiro Sekine, Kawasaki (JP); Yasunobu Yamauchi, Kawasaki (JP); Shingo Yanagawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/792,842

(22) Filed: Mar. 5, 2004

(65) Prior Publication Data
US 2004/0212625 A1 Oct. 28, 2004

(30) Foreign Application Priority Data
Mar. 7, 2003 (JP) ............................ 2003-062180
Mar. 3, 2004 (JP) ............................ 2004-059407

(51) Int. Cl.
G09G 5/00 (2006.01)
(52) U.S. Cl. .................... 345/582; 345/552; 345/586; 345/587; 345/589; 345/619; 382/294
(58) Field of Classification Search ................ 345/582, 345/587, 586
See application file for complete search history.

(56) References Cited

U.S. PATENT DOCUMENTS

| 6,097,394 | A | | 8/2000 | Levoy et al. | |
|---|---|---|---|---|---|
| 6,148,283 | A | * | 11/2000 | Das .............................. | 704/222 |
| 6,154,216 | A | * | 11/2000 | Walton ........................ | 345/619 |
| 6,297,834 | B1 | | 10/2001 | Malzbender | |
| 6,683,994 | B1 | * | 1/2004 | de Queiroz et al. ........ | 382/260 |
| 6,738,058 | B1 | * | 5/2004 | Gruber et al. ............... | 345/419 |
| 6,819,793 | B1 | * | 11/2004 | Reshetov et al. ........... | 382/166 |
| 6,865,291 | B1 | * | 3/2005 | Zador .......................... | 382/166 |
| 2002/0075274 | A1 | * | 6/2002 | Walton ........................ | 345/582 |
| 2002/0099721 | A1 | * | 7/2002 | Ganapathy et al. ........ | 707/104.1 |
| 2002/0126116 | A1 | * | 9/2002 | Grzeszczuk et al. ........ | 345/420 |
| 2003/0040905 | A1 | * | 2/2003 | Wang et al. ................. | 704/223 |
| 2003/0044078 | A1 | * | 3/2003 | Joshi et al. .................. | 382/243 |
| 2003/0081852 | A1 | * | 5/2003 | Pohjola ....................... | 382/253 |
| 2004/0041816 | A1 | | 3/2004 | Yamauchi | |
| 2004/0252892 | A1 | | 12/2004 | Yamauchi et al. | |

OTHER PUBLICATIONS

Levoy et al.; "Light Field Rendering"; Proceedings of SIGGRAPH, pp. 1-12, 1996.*

(Continued)

Primary Examiner—Kee M. Tung
Assistant Examiner—Antonio Caschera
(74) Attorney, Agent, or Firm—Finnegan, Henderson, Farabow, Garrett & Dunner, L.L.P.

(57) ABSTRACT

A multi-dimensional texture synthesis apparatus includes a generator to generate a reference multi-dimensional texture including a codebook and a reference index image, the codebook including a set of color information of the same-position pixels of the reference texture images, and the reference index image including a set of indexes for addressing the codebook, a quantizater to quantize the reference multi-dimensional texture at one or more quantization levels to generate a quantized codebook and a quantized reference index image, a synthesizer to synthesize a new index image having a specified size from the quantized reference index image using a hierarchical structure of the reference multi-dimensional texture corresponding to the one or more quantization levels, and a generator to generate the new multi-dimensional texture by combining the new index image with the quantized codebook.

17 Claims, 34 Drawing Sheets

OTHER PUBLICATIONS

Chen et al.; "Light Field Mapping: Efficient Representation and Hardware Rendering of Surface Light Fields"; Proceedings of SIGGRAPH, pp. 447-456, 2002.*

Wei et al.; "Fast Texture Synthesis Using Tree-Structured Vector Quantization"; Proceedings of SIGGRAPH, pp. 479-488, 2000.*

Gortler et al., "The Lumigraph," Proceedings of SIGGRAPH, pp. 43-52, 1996.*

Dana et al.; "Reflectance and Texture of Real-World Surfaces"; ACM Transaction on Graphics, pp. 1-34, (1999).

Wei et al.; "Fast Texture Synthesis Using Tree-Structured Vector Quantization"; Proceedings of SIGGRAPH, pp. 479-488, (2000).

Levoy et al.; "Light Field Rendering"; Proceedings of SIGGRAPH, pp. 1-12, (1996).

Gortler et al.; "The Lumigraph"; Proceedings of SIGGRAPH, pp. 43-52, (1996).

Ashikhmin; "Synthesizing Natural Textures"; 2001 ACM Symposium on Interactive 3D Graphics; pp. 217-226, (2001).

Chen et al.; "Light Field Mapping: Efficient Representation and Hardward Rendering of Surface Light Fields"; Proceedings of SIGGRAPH, pp. 447-456, (2002).

* cited by examiner

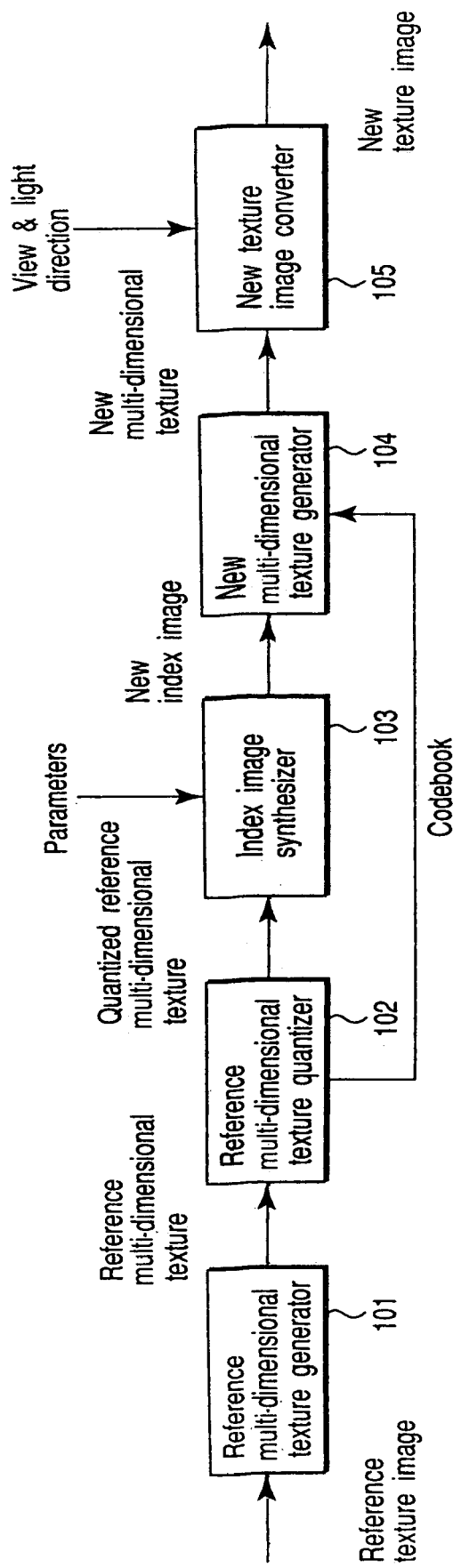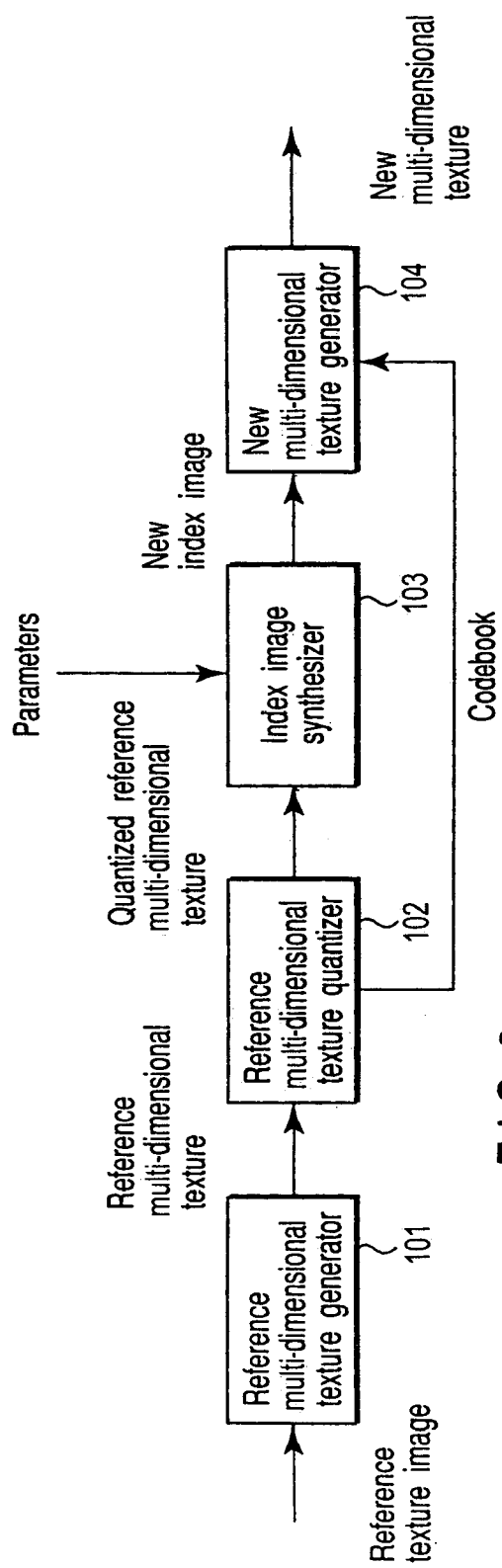

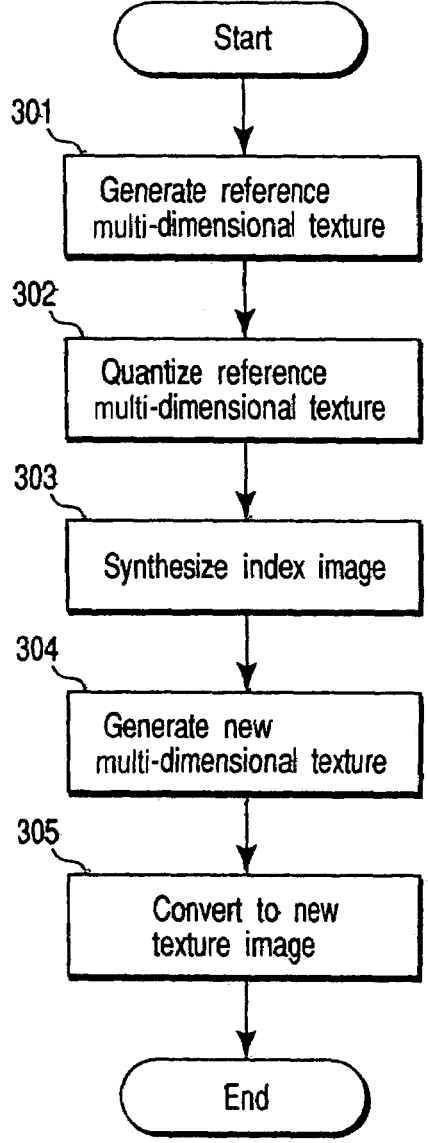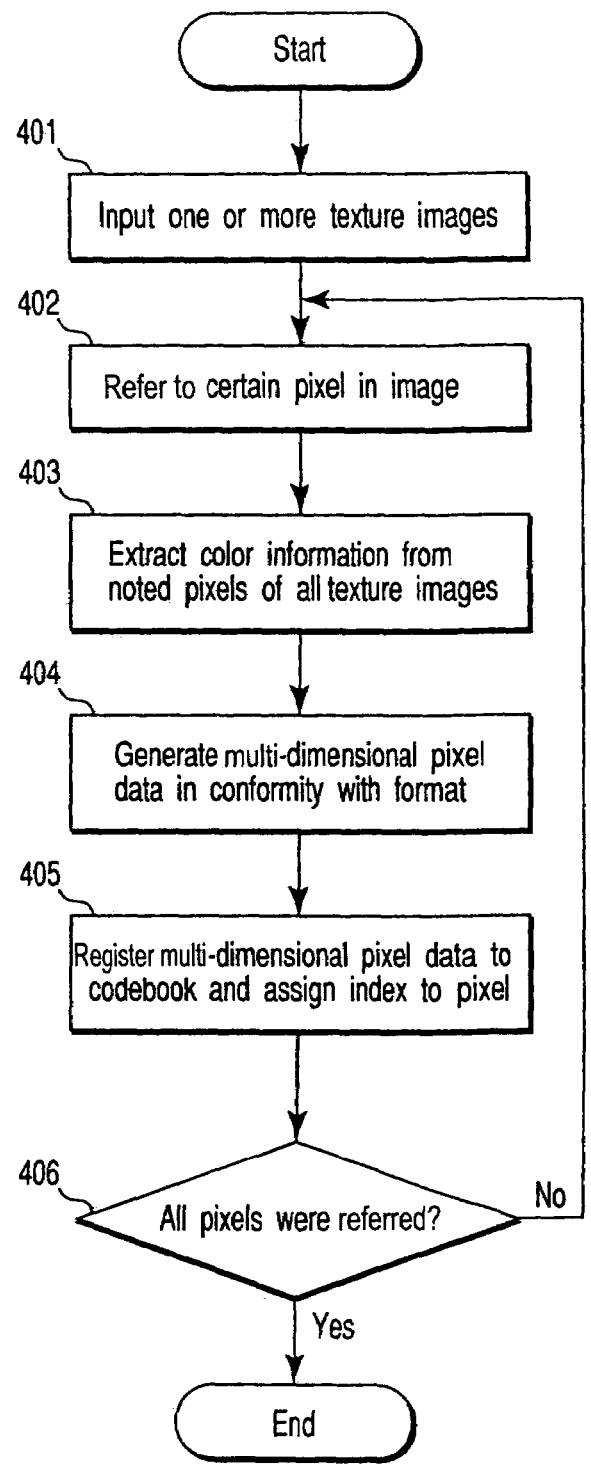
FIG. 3
FIG. 4

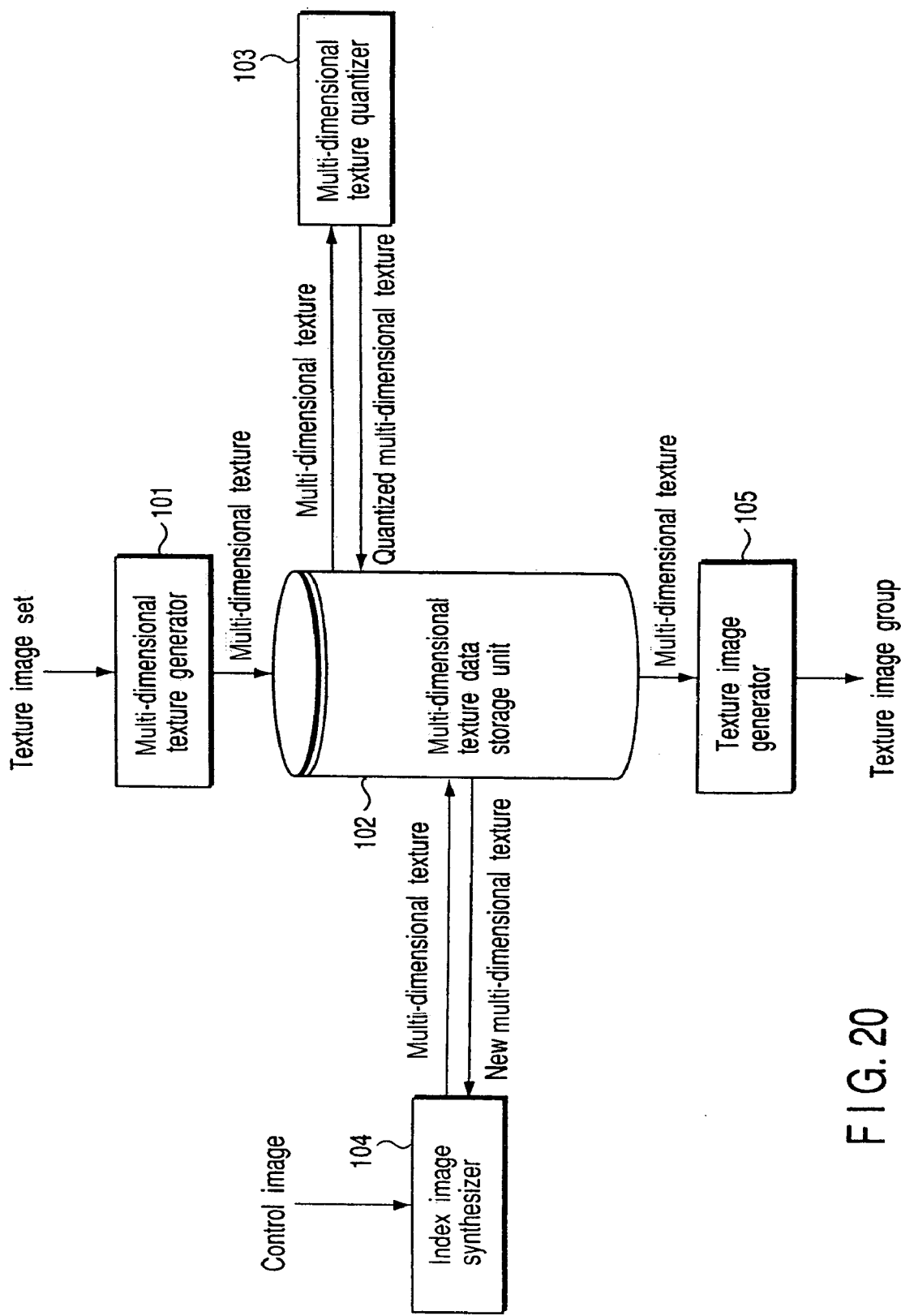
F I G. 20

FIG. 30

Reference index image side

Two pixels coincide 5 pixels coincide 3 pixels coincide 2 pixels coincide

New index image side

Hierarchy h (quantization error $\varepsilon_h$)

Hierarchy h-1 (quantization error $\varepsilon_{h-1}$)

Hierarchy h-2 (quantization error $\varepsilon_{h-2}$)

Hierarchy h-3 (quantization error $\varepsilon_{h-3}$)

Pixel that indexes coincide

Pixel that indexes already coincide in upper layer

Evaluation value : $\varepsilon_h \times 2 + \varepsilon_{h-1} \times 5 + \varepsilon_{h-2} \times 3 + \varepsilon_{h-3} \times 2$

APPARATUS AND METHOD FOR SYNTHESIZING MULTI-DIMENSIONAL TEXTURE

CROSS-REFERENCE TO RELATED APPLICATIONS

This application is based upon and claims the benefit of priority from prior Japanese Patent Applications No. 2003-062180, filed Mar. 7, 2003; and No. 2004-59407, filed Mar. 3, 2004, the entire contents of both of which are incorporated herein by reference.

BACKGROUND OF THE INVENTION

1. Field of the Invention

The present invention relates to an image synthesis suitable for high quality texture mapping in the field of three dimension computer graphics, particularly to a high-dimensional texture synthesis apparatus to synthesize a texture image of an arbitrary size according to conditions such as a viewpoint direction and a light source direction, and a high-dimensional texture synthesis method.

The present invention relates to an image synthesis suitable for high quality texture mapping in the field of three dimension computer graphics, particularly to a multi-dimensional texture synthesis apparatus to synthesize a texture image of an arbitrary size according to conditions such as a viewpoint direction and a light source direction, and a multi-dimensional texture synthesis method.

2. Description of the Related Art

The posture of a three-dimension object, that is, the shape of the three-dimensional object and the surface color and quality impression thereof vary based upon a direction (a viewpoint direction) watching the three-dimensional object and a direction (a light source direction) irradiating a light beam. In a field of three-dimensional computer graphics, the surface of three-dimensional object is divided into a number of two-dimensional plains called polygons, the drawing is executed every polygon to create a two-dimensional image to be used as a display image of three-dimensional object.

The posture of the three-dimensional object when the viewpoint direction and light source direction vary can be expressed by changing a direction of display polygon (three-dimensional posture) and the optical characteristic of the polygon (brightness) along with the viewpoint direction and light source direction. However, computation of a relation between a normal defining a direction (three-dimensional posture) of the polygon that is a drawing unit and a viewpoint direction or a light source direction needs a vector operation of floating point precision. This results in increasing a computing cost and complicating practical use in terms of hardware and software.

In late years, a scheme for synthesizing a texture image of an arbitrary size by small texture images is proposed (Li-Yi Wei, Marc Levoy, "Fast Texture Synthesis Using Tree-structured Vector Quantization", Proceedings SIGGRAPH 2000, pp. 479–488, and Michael Ashikhmin, "Synthesizing Natural Textures", 2001 ACM Symposium on Interactive 3D Graphics, pp. 217–226). This scans a texture image of an arbitrary size referring to an original small texture image and synthesizes a texture image near to the original image.

In addition, there is proposed a scheme for preparing a target texture image other than the referring small texture image and synthesizing an image having the design and pattern of the referring texture image and resembling the materials of the referring small texture image.

However, such a conventional texture image synthesis technology synthesizes merely a simple texture image, and cannot synthesize in a lump a number of texture images concerning multiple viewpoints and multiple light sources.

As described above, when the optical characteristic of the object surface varying according to a viewpoint direction and a light source direction is expressed in texture, a large number of texture images that differ in the viewpoint direction and light source direction are necessary, resulting in enormous computing quantity.

BRIEF SUMMARY OF THE INVENTION

It is an object of the present invention to provide an apparatus and method to synthesize from a number of texture image data a texture image of an arbitrary size which can express realistically the optical characteristic of the object surface varying according to a light source direction and a viewpoint direction.

According to an aspect of the invention, there is provided a multi-dimensional texture synthesis apparatus to synthesize a new multi-dimensional texture using, as one or more reference texture images, one or more texture images captured or drawn on a plurality of different conditions, comprising: a reference multi-dimensional texture generator to generate a reference multi-dimensional texture including a codebook and a reference index image, the codebook including a set of color information of the same-position pixels of the reference texture images, and the reference index image including a set of indexes for addressing the codebook; a reference multi-dimensional texture quantizer to quantize the reference multi-dimensional texture at one or more quantization levels and generate a quantized codebook and a quantized reference index image; an index image synthesizer to synthesize a new index image having a specified size from the quantized reference index image using a hierarchical structure of the reference multi-dimensional texture corresponding to one of the quantization levels; and a new multi-dimensional texture generator to generate the new multi-dimensional texture by combining the new index image with the quantized codebook.

BRIEF DESCRIPTION OF THE SEVERAL VIEWS OF THE DRAWING

FIG. 1 is a block diagram of a multi-dimensional texture synthesis apparatus according to a first embodiment of the present invention;

FIG. 2 is a block diagram of a multi-dimensional texture synthesis apparatus according to modification of the first embodiment;

FIG. 3 is a flowchart representing a series of steps of the process executed with the multi-dimensional texture synthesis apparatus according to the first embodiment;

FIG. 4 is a flowchart for generating a reference multi-dimensional texture and a target multi-dimensional texture;

FIG. 20 is a block diagram of a multi-dimensional texture synthesis apparatus according to the fourth embodiment of the present invention;

FIG. 30 is a diagram of to explain an index image synthesis method with the use of an approximate evaluation value;

FIG. 37 is a diagram to explain unionization of a codebook to be referred to.

DETAILED DESCRIPTION OF THE INVENTION

Figure 5:
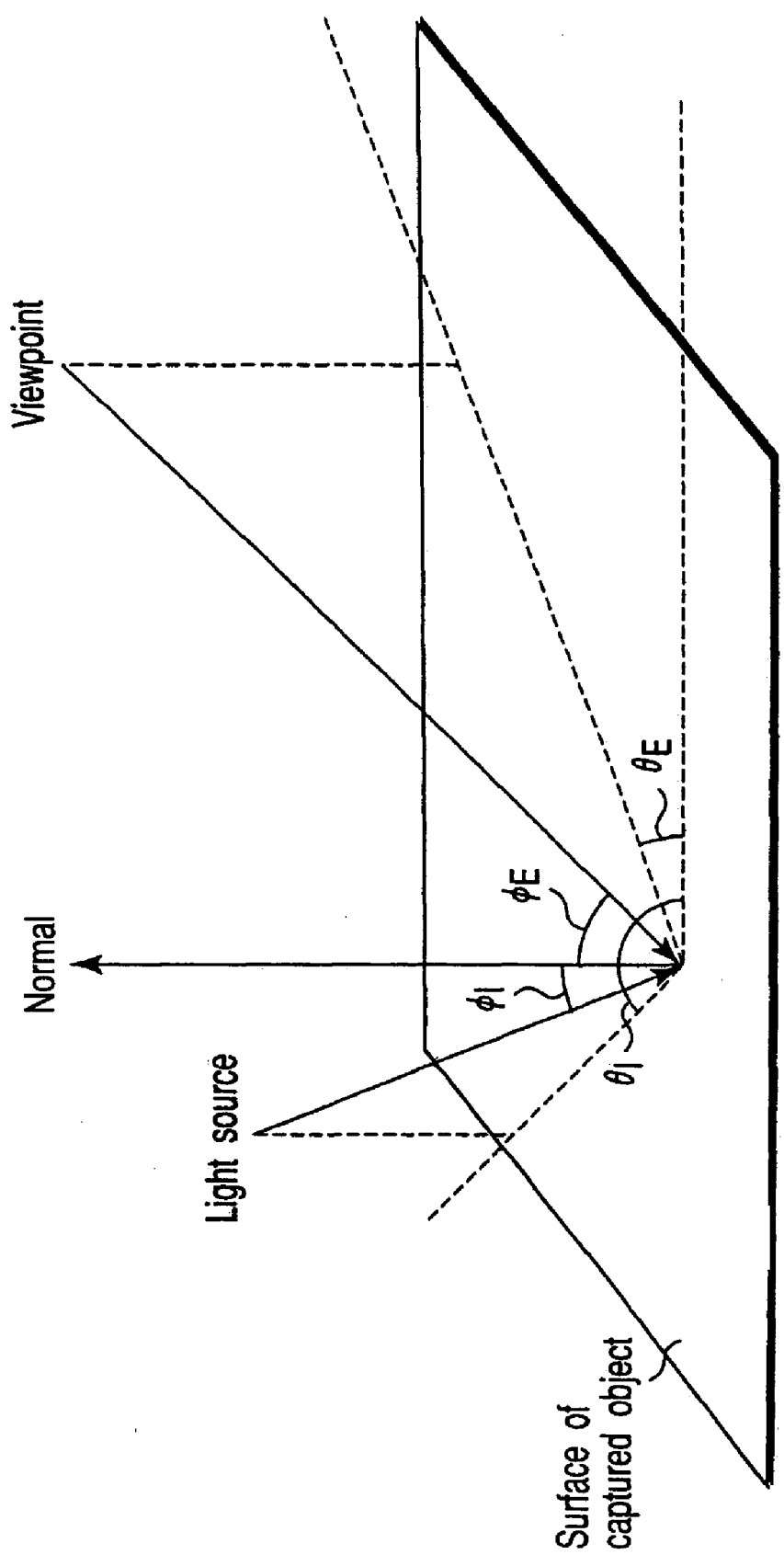
FIG. 5 is a diagram for explaining a method of acquiring a texture image on various conditions (viewpoint/light source)

There will now be described an embodiment of the present invention in conjunction with the accompanying drawings.

(First Embodiment)

FIG. 1 is a diagram of configuration of a multi-dimensional texture synthesis apparatus according to the first embodiment of the present invention.

The multi-dimensional texture synthesis apparatus comprises a reference multi-dimensional texture generator 101, a reference multi-dimensional texture quantizer 102, an index image synthesizer 103, a new multi-dimensional texture generator 104 and a new texture image converter 105. The reference multi-dimensional texture generator 101 inputs one or more reference texture images captured or drawn with a plurality of different conditions and generates a reference multi-dimensional texture image by gathering color information items of the same-position pixels. The reference multi-dimensional texture quantizer 102 subjects the generated reference high dimension texture to vector quantization at one or more quantization levels to generate a codebook. There will be later described a method of generating a reference multi-dimensional texture, a data structure of the multi-dimensional texture and a vector quantization method.

The index image synthesizer 103 is supplied with a quantized reference multi-dimensional texture and synthesizes a new index image of an arbitrary size by repeating a similar pixel search based on the quantized reference multi-dimensiontional texture. A method of synthesizing a new index image is later described in detail. The new multi-dimensional texture generator 104 combines the new index image generated by the index image synthesizer 103 with a codebook generated by the reference multi-dimensional texture quantizer 102 to generate a new multi-dimensional texture according to the data structure of the multi-dimensional texture. The new texture image converter 105 is supplied with the new multi-dimensional texture and outputs a texture image corresponding to a specific acquisition condition or a generation condition.

FIG. 2 shows a configuration of a multi-dimensional texture synthesis apparatus concerning a modification of the first embodiment. In this modification, like reference numerals are used to designate like structural elements corresponding to those in FIG. 1 and any further explanation is omitted for brevity's sake. This apparatus comprises a configuration that the new texture image converter 105 is removed from the apparatus of FIG. 1. This apparatus outputs a new texture image based on the new multi-dimensional texture output from the new multi-dimensional texture generator 104, and can realize effective texture mapping to a three-dimensional object.

FIG. 3 shows a process executed by the multi-dimensional texture synthesis apparatus according to the first embodiment.

At first, a reference multi-dimensional texture is generated based on the reference texture image according to a processing shown in FIG. 4 (step 301). The reference multi-dimensional texture is quantized by the reference multi-dimensional texture quantizer 102 (step 302). A new index image is synthesized based on the quantized reference multi-dimensional texture (step 303). A new multi-dimensional texture is made of the new index image and the codebook (step 304). The new multi-dimensional texture is converted into a new texture image (step 305).

FIG. 4 shows a process of the reference multi-dimensional texture generation step (301) executed by the reference multi-dimensional texture generator 101. One or more reference texture images captured or drawn with a plurality of different conditions are input to the reference multi-dimensional texture generator (sub-step 401). In the present embodiment, actual captured images acquired at a plurality of camera positions (referred to as viewpoints) and light source positions are used.

As mentioned above, the present embodiment directs to expressing realistically the optical characteristic of the object surface that varies according to a viewpoint direction or a light source direction. The reference texture images are acquired as shown in FIG. 5.

In other words, assuming a spherical coordinate system that a normal vector of the object surface is an axis and the object surface becomes an equatorial plane (a mask passing through the equator). In this coordinate system, when a polar angle $\theta$ and an azimuthal angle $\phi$ are used, multi-viewpoint/multi-light source texture images to be prepared as input data can be specified by four parameters of a viewpoint direction ($\theta E$, $\phi E$) and a light source direction ($\theta I$, $\phi I$).

In the present embodiment, a texture image acquired in a certain specific viewpoint and light source is identified by parameters of T ($\theta E$, $\phi E$, $\theta I$, $\phi I$). In the present embodiment, assuming that samples in the viewpoint direction are W samples with respect to an axis $\theta E$ and X samples with respect to an axis $\phi E$, and samples in the light source direction are Y samples with respect to an axis $\theta I$ and Z samples with respect to an axis $\phi I$. Therefore, $(W \times X) \times (Y \times Z)$ texture images acquired by combination of $W \times X$ viewpoints and $Y \times Z$ light sources are input to the reference multi-dimensional texture generator 101 as reference texture images.

The reference multi-dimensional texture is generated by the reference multi-dimensional texture generator 101 according to the following procedure.

A pixel (i, j) of the reference texture image is referred (402), and the color information item of the referred pixel (i, j) is extracted from each of all reference texture images (403).

Figure 7:
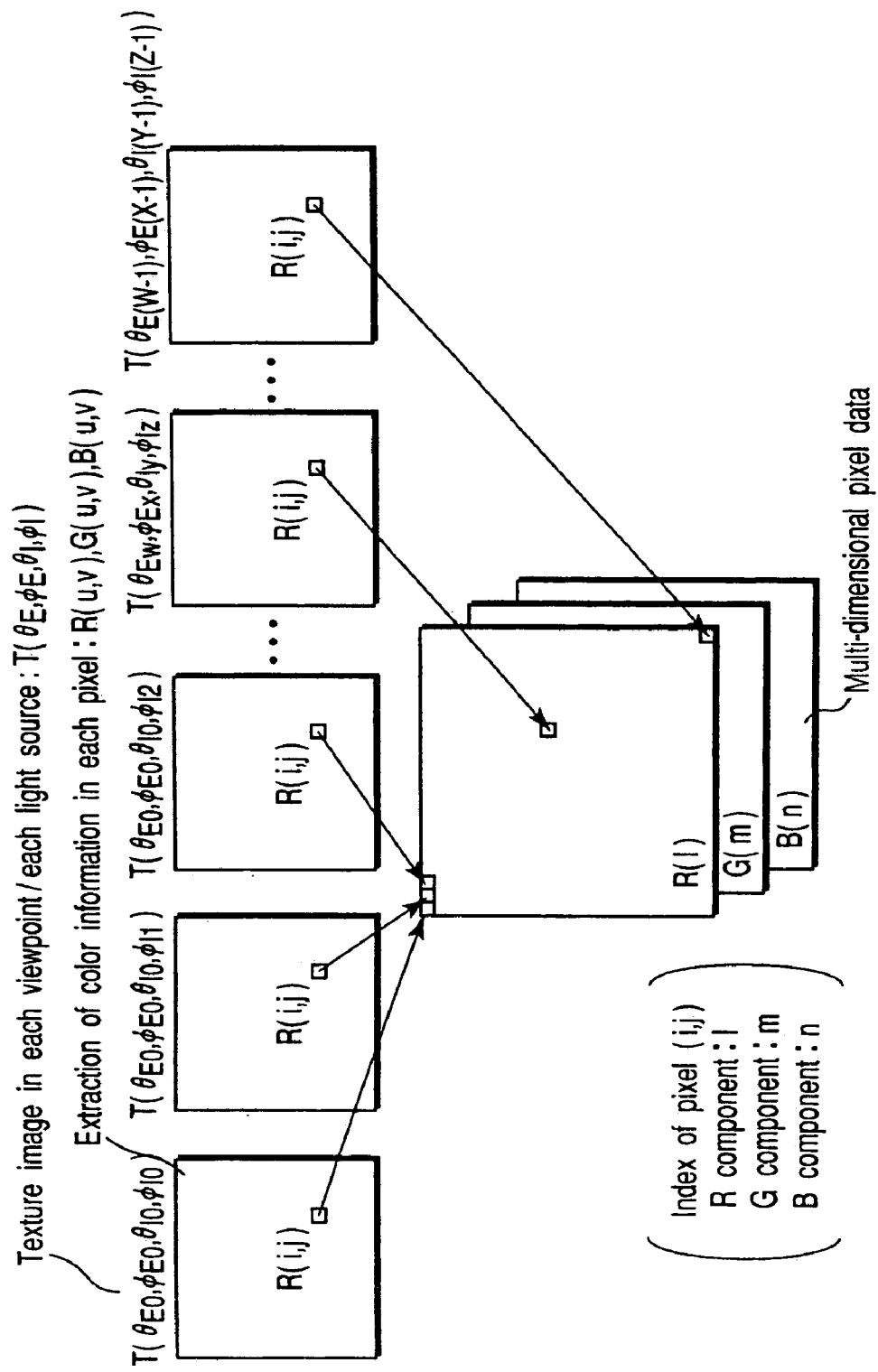
FIG. 7 is a diagram for explaining extraction of color information of the identical pixel from a plurality of reference texture images.

FIG. 7 is a diagram to explain extraction of color information items of the same-position pixels from a plurality of reference texture images. The color components of the same-position pixels from the $(W \times X) \times (Y \times Z)$ reference texture images are extracted. The extracted color components are arranged in a given format to generate multi-dimensional pixel data for each of the R, G, and B components (404).

In other words, the color components of the same-position pixels extracted from the plurality of reference texture images, respectively, are inserted in $(W \times X) \times (Y \times Z)$ pixels sequentially to generate multi-dimensional pixel data.

The generated multi-dimensional pixel data is stored in the codebook, and an index is assigned to the referred pixel (i, j) (405). When the above-mentioned process is done for all pixels (406), the reference multi-dimensional texture generation process is finished. In other words, the sub-steps 402–406 in FIG. 4 are repeated to generate the reference multi-dimensional texture.

Figure 6:
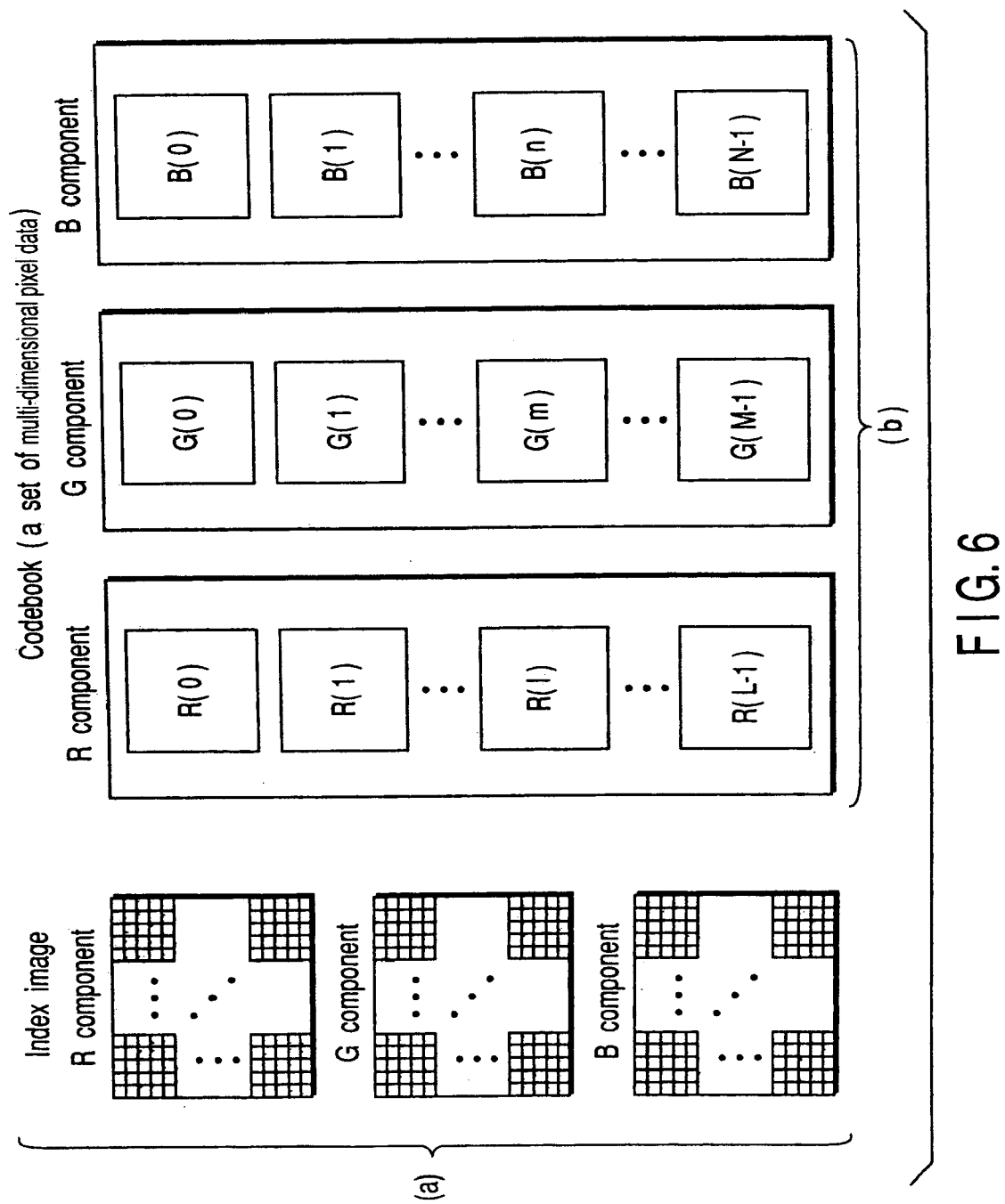
FIG. 6 is a diagram showing an example of data structure of the multi-dimensional texture.

An example of data structure of the multi-dimensional texture is shown in FIG. 6. The multi-dimensional texture comprises a codebook and a reference index image. The codebook comprises collection of data items as referred to as multi-dimensional pixel data (as described later), and the reference index image comprises collection of index information items for addressing multi-dimensional pixel data in the codebook.

In the present embodiment, the reference index image and codebook are prepared with respect to the color component of each of R, G and B components. The multi-dimensional texture handling all of R, G and B components in a lump or the multi-dimensional texture whose brightness component and color component are separated from each other can be made in the same manner. The multi-dimensional pixel data is data obtained by collecting color information items in certain pixels. The multi-dimensional pixel data items of R, G and B components are assumed R (l), G (m) and B (n) respectively. These are multi-dimensional pixel data items corresponding to indexes l, m and n, respectively. The codebook sizes of R, G and B components shown in FIG. 6 are L, M and N, respectively. The larger the codebook size is, the more the multi-dimensional pixel data diversifies.

Figure 8:
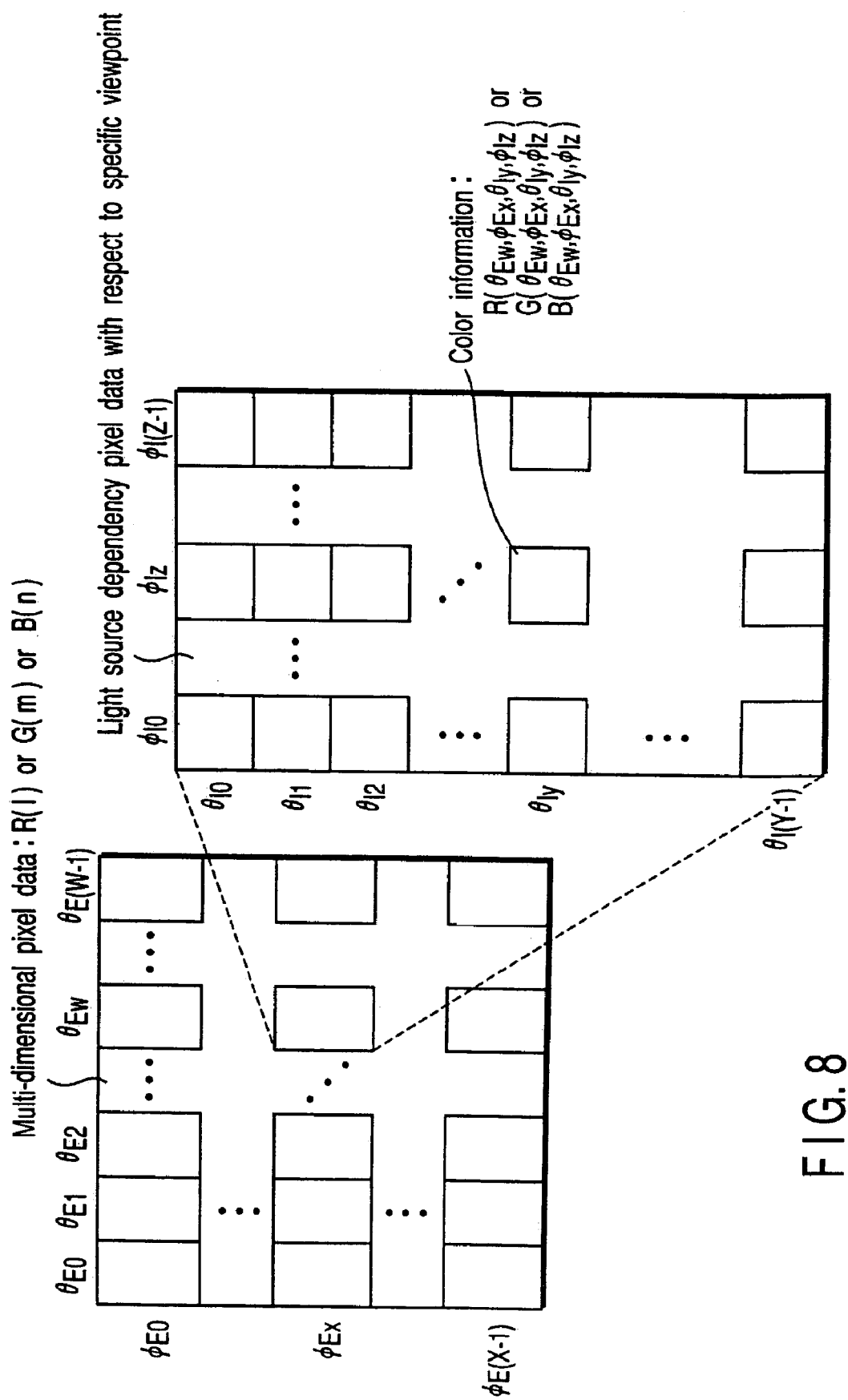
FIG. 8 is a diagram showing a form of multi-dimensional pixel data.

FIG. 8 is a diagram for explaining a format of the multi-dimensional pixel data according to the present embodiment. The light source dependence pixel data items in a specific viewpoint which are arranged with respect to a horizontal axis $\phi I$ and a vertical axis $\theta I$ are formed in a block. The block is arranged every viewpoint with respect to the horizontal axis $\theta E$ and the vertical axis $\phi E$. When all the reference texture images are $U \times V$ pixels, the input and output of the reference multi-dimensional texture generator 101 are as follows.

TABLE 1

| Reference Multi-Dimensional Texture Generator |
|---|
| Input |
| Reference texture |
| Color image of 24 bits/pixel |
| U × V pixels |
| (W × V) × (Y × Z) images |
| Output |
| Multi-dimensional pixel data (for each of R, G and B components) |
| Monochrome image of 8 bits/pixel |
| (X × Y) × (W × Z) pixels |
| U × V images |
| Index image (for each of R, G and B components) |
| Monochrome image of 8 bits/pixel |
| U × V pixels |
| One image |

Table 1: Reference Multi-Dimensional Texture Generator

Figure 9:
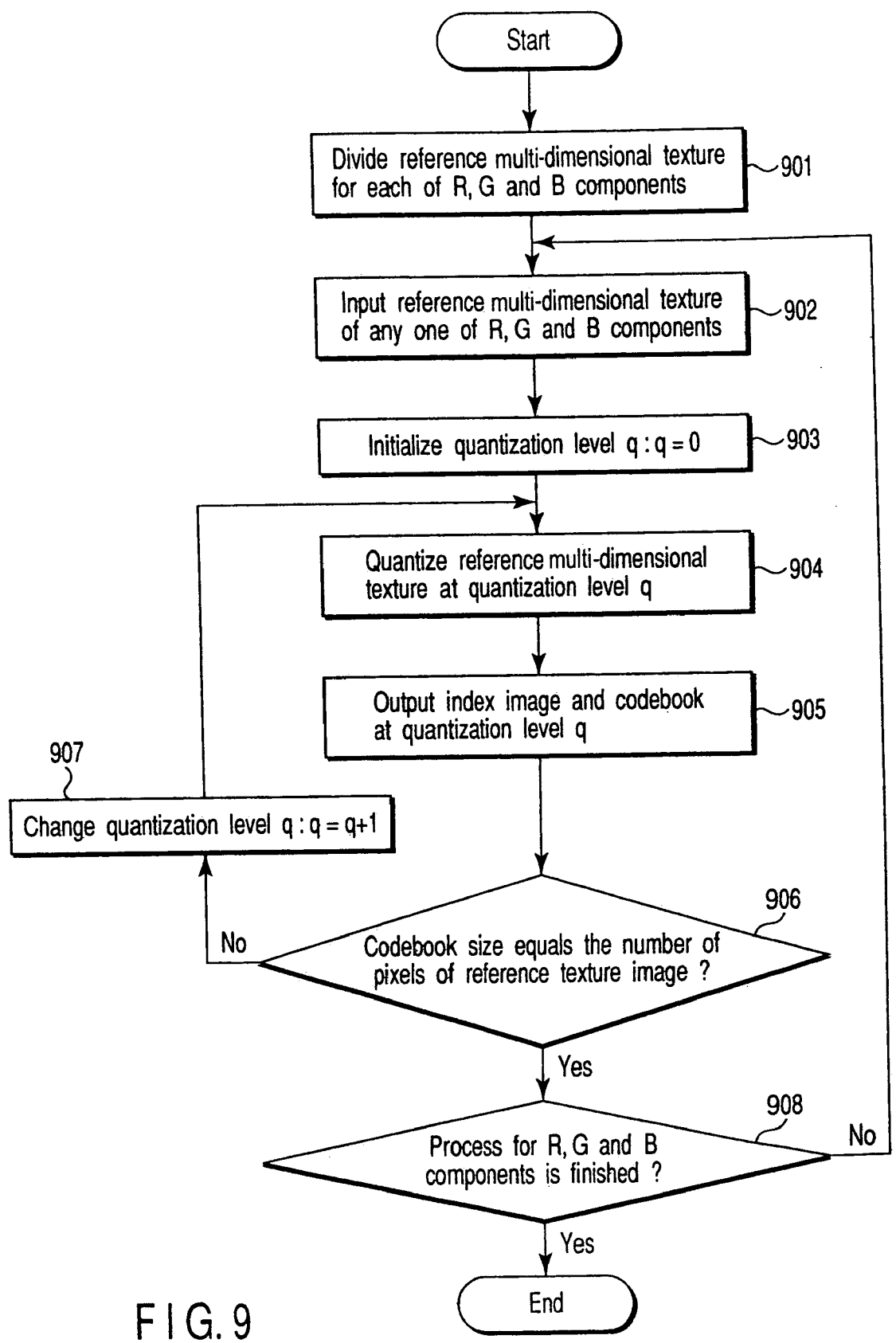
FIG. 9 is a flowchart of a reference multi-dimensional texture quantization.

FIG. 9 is a flowchart of the reference multi-dimensional texture quantization step (302) in the reference multi-dimensional texture quantizer 102.

At first, the reference multi-dimensional texture is input to the reference multi-dimensional texture quantizer 102, and the R, G and B components are divided separately (901). When the reference multi-dimensional texture of any one of the R, G and B components is input (902), the quantization process is started. A parameter such as a quantization level q is prepared, and incremented from an initial value 0 (903, 907). A codebook size is designated according to the quantization level q. The codebook size is increased with an increase in the value q. The quantization process is finished at the quantization level at which the codebook size equals the number of the pixels (906). An example of a method of setting the quantization level when the size of reference texture image is 32×32 pixels is shown as follows.

| Quantization level q | 0 | 1 | 2 | 3 | 4 | 5 | 6 | 7 | 8 | 9 |
|---|---|---|---|---|---|---|---|---|---|---|
| Codebook size | 2 | 4 | 8 | 16 | 32 | 64 | 128 | 256 | 512 | 1024 |

The quantization process at each quantization level may use a conventional vector quantization (VQ). However, the present embodiment uses an improvement scheme suitable for this apparatus. The full search vector quantization (FSVQ) adding a process to fix a cluster of error 0 or the tree structured vector quantization (TSVQ) outputting a codebook of a tree structure are employed. The former scheme fixes a cluster of error 0 as preprocessing, and does not include the fixed cluster in an object to be subjected to a cluster division afterward. Although this scheme is a full search, a target quantization level can be attained at a comparatively short time.

On the other hand, the latter scheme performs cluster division so as to make a tree structure. This scheme lowers in precision of quantization in comparison with the former scheme, but can quantize at a short time. TSVQ has a great effect to shorten a processing time in an index image synthesizer described later.

After quantization (904), the multi-dimensional texture, namely, the reference index image and codebook, corresponding to each quantization level are output (905).

When the above-mentioned process is done for R, G and B components (908), the reference multi-dimensional texture quantization is finished.

Figure 10:
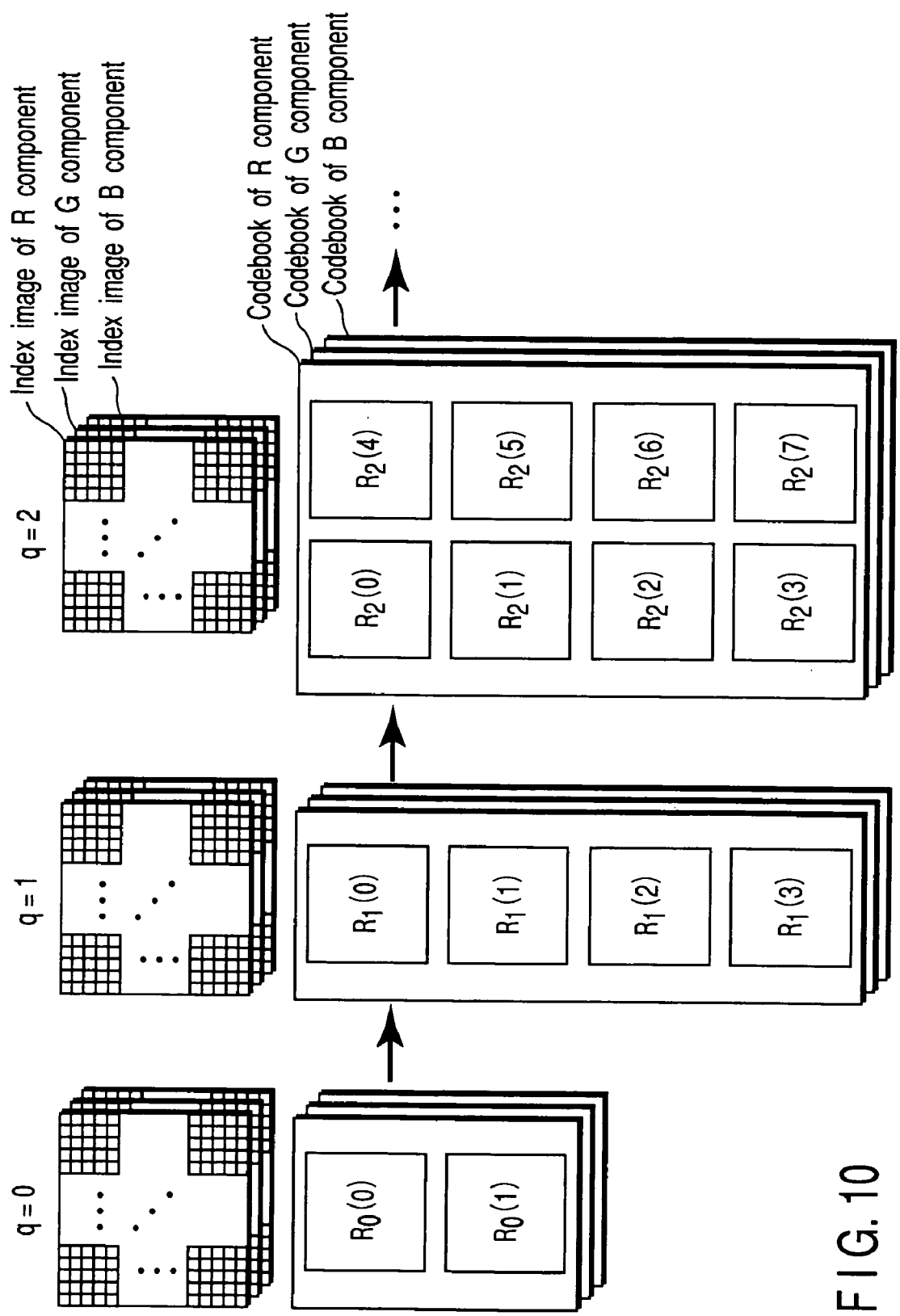
FIG. 10 shows a configuration of layered multi-dimensional texture.

The configuration of the quantized reference multi-dimensional texture output from the reference multi-dimensional texture quantizer 102 is shown in FIG. 10. The R, G and B components each hold an independent multi-dimensional texture every quantization level. The codebook size increases as q increases, and the reference multi-dimensional textures are expressed hierarchically.

Figure 11:
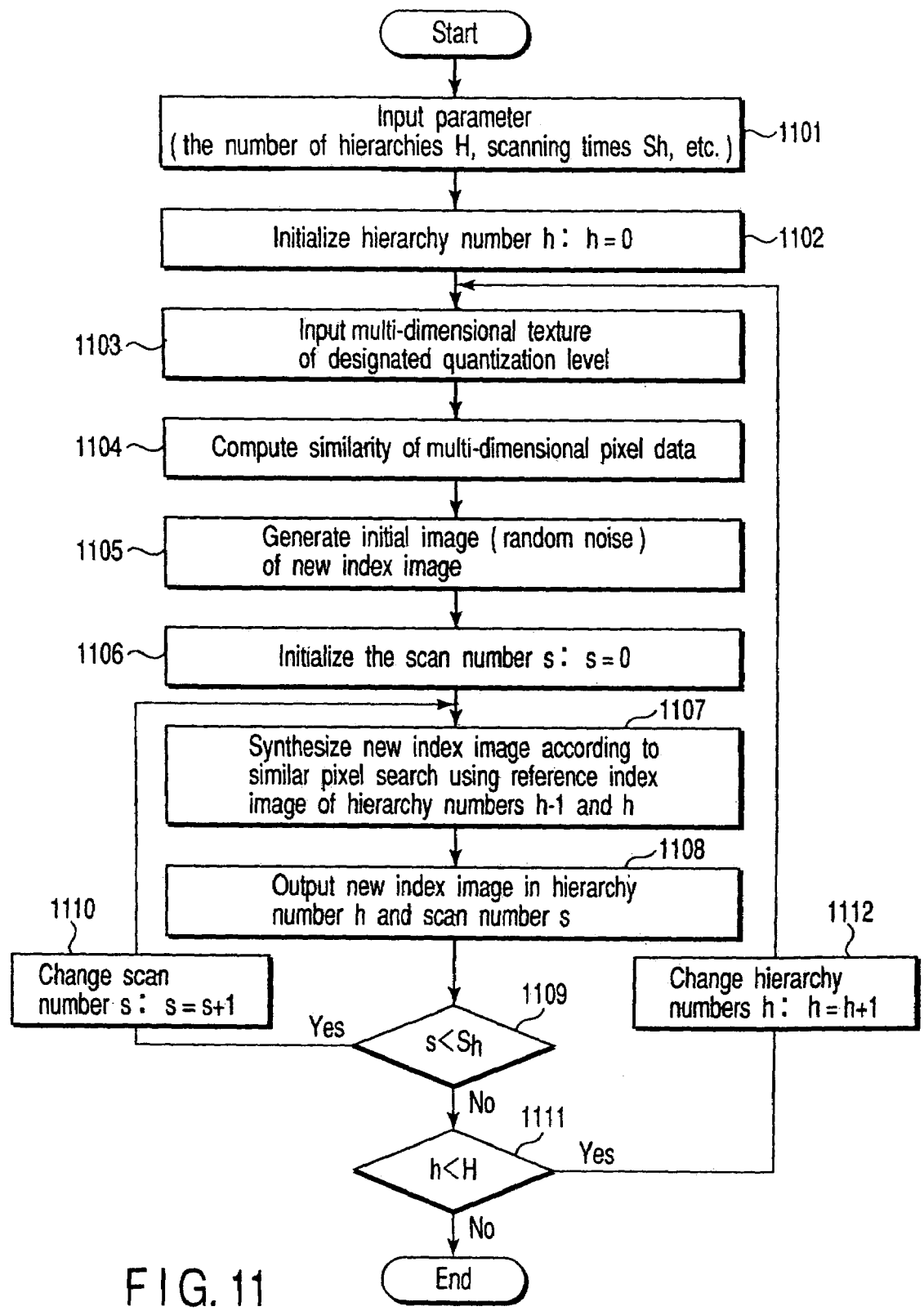
FIG. 11 is a flowchart of index image synthesis.

FIG. 11 is a flowchart of index image synthesis (303) in the index image synthesizer 103. At first, parameters are input (1101). The parameters include a reference texture image size, the number of the reference texture images (size of multi-dimensional pixel data), a reference multi-dimensional texture name (an input filename), a new texture image size, a new multi-dimensional texture name (an output file name), the number of hierarchies H, a quantization level in each hierarchy (R, G or B component), the number of scans Sh in each hierarchy, a rewritten block size in each scan, and a neighborhood block size in each scan.

The hierarchy number h is initialized (h=0), and an index image synthesis process is performed every hierarchy until the hierarchy number becomes H−1 (1102, 1111, 1112). At each hierarchy, the reference multi-dimensional texture of the quantization level designated by the parameter is input (1103). The designation of the quantization level in each hierarchy is done for each of R, G and B components. The quantization level increases as the hierarchy number increases.

Similarity of multi-dimensional pixel data existing in the input reference multi-dimensional texture is computed (1104). This process includes a process computing the evaluation value used when executing a similar pixel search as described below. The index image of the input reference multi-dimensional texture is noted, and the similarity of multi-dimensional pixel data designated by the index with respect to combination of all pixels is evaluated by using SAD (Sum of Absolute Difference), a correlation value or an inner product as an evaluation value. When TSVQ is done by the reference multi-dimensional texture quantizer 102, the computation in step 1104 is not necessary, because the similarity can be evaluated only by tracing the codebook making a tree structure.

The noise image to which the indexes existing in the reference index image are assigned at random is generated as an initial image of new index image (1105). The scan number is initialized (s=0), and the index is rewritten by the similar pixel search as described later while the new index image is repeatedly scanned till the scan number becomes Sh−1 (1106, 1109, 1110). In synthesis of the new index image in each scan (1107), the new index image is rewritten every designated block size from the upper left to the lower right (1108).

The similar pixel search is used for rewriting the index. The similar pixel search is to use blocks adjacent to a block to be rewritten and find a block with the highest similarity from blocks of the same shape existing in the reference index image.

All blocks of the same shape existing in the reference index image may be evaluated, or candidates may be listed from the beginning. There is a method wherein the blocks corresponding to the positions that respective pixels of the neighborhood block refer to are used as candidates, and the most suitable block is selected from the candidates. When the number of pixels of the neighborhood block is 20, the candidates are 20, so that the searching can be efficiently done.

The similar pixel search uses not only data of the current hierarchy h but also data of the hierarchy h−1 just before the current hierarchy. By using the hierarchy just before the current hierarchy, a process at the just before hierarchy can be reflected, so that accuracy improves.

Figures 12A, 12B:
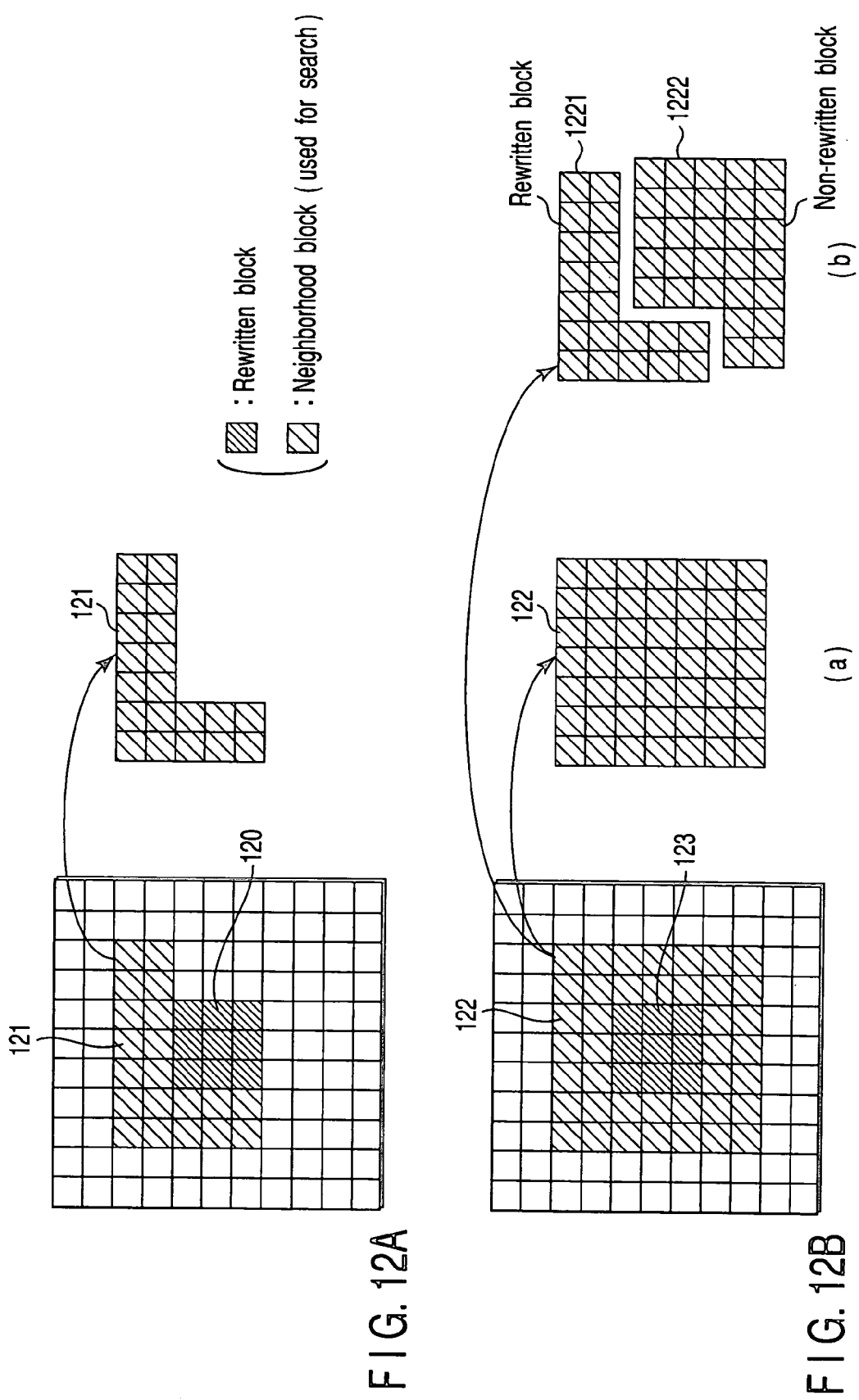
FIGS. 12A and 12B are diagrams for explaining a similar pixel search.

FIGS. 12A and 12B are diagrams of explaining how to select blocks in the similar pixel search.

The similar pixel search carries out either of a L-shaped search (FIG. 12A) or a rectangular search (FIG. 12B). In the case of FIGS. 12A and 12B, the to-be-rewritten block 120 has a size of 3×3 pixels and the neighborhood block 121 has a size of 7×7 pixels. The rectangular search carries out the search using all of 7×7 pixels of the neighborhood block. In contrast, the L-shaped search performs the search using pixels (20 pixels arranged in L-shape) which were already rewritten among 7×7 pixels of the neighborhood block. In the rectangular search of the present embodiment, a block 122 formed of a rewritten block 1221 and a non-rewritten block 1222 is used. A block 123 is a to-be-rewritten block.

Figure 13:
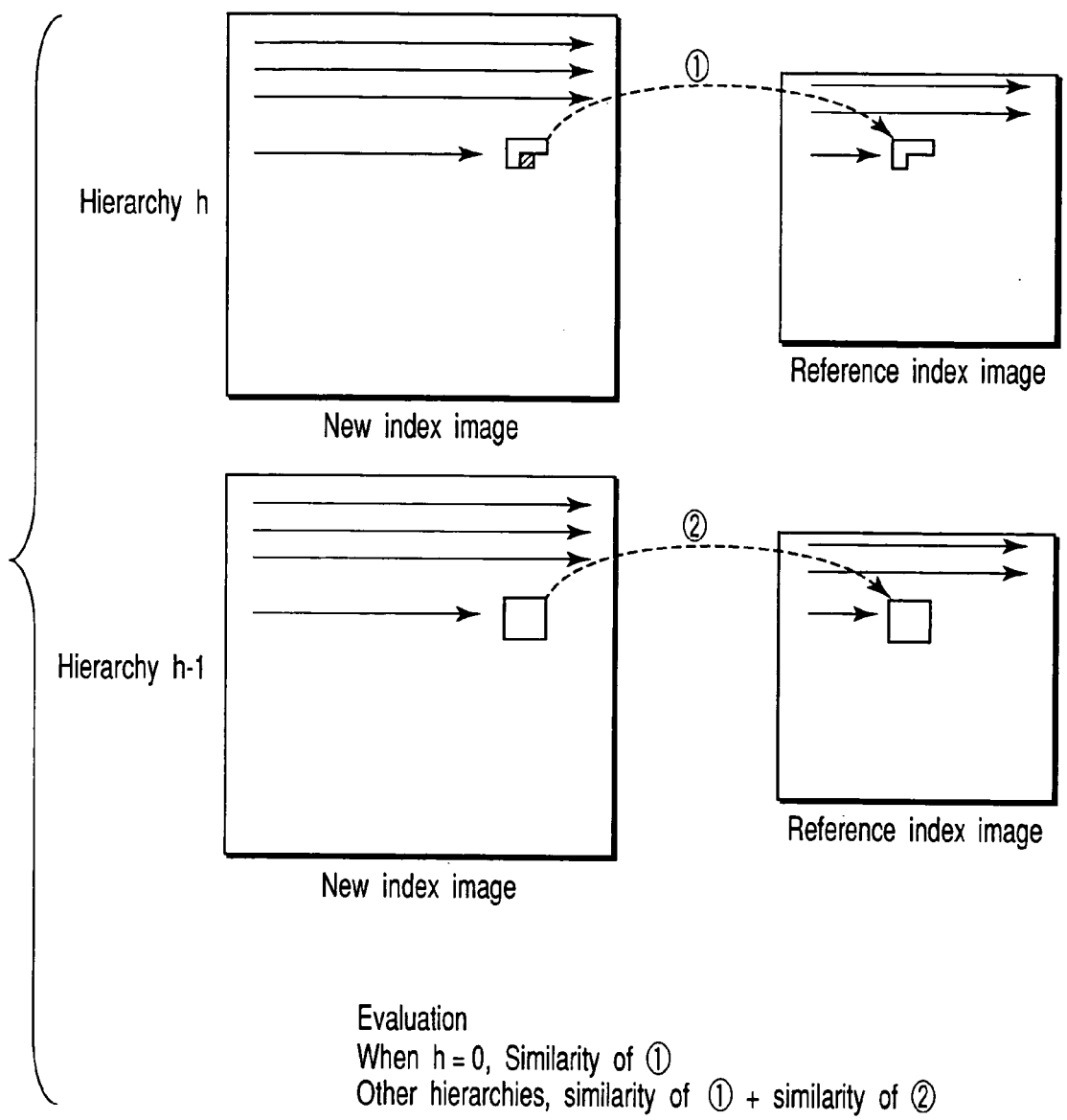
FIG. 13 is a diagram for explaining a similar pixel search in hierarchy h.

FIG. 13 is a diagram for explaining the similar pixel search for the hierarchy h. When h=0, the L-shaped search is done in the hierarchy 0 to evaluate merely by the similarity. When it is not h=0, the L-shaped search for the hierarchy h and the rectangular search for the hierarchy h−1 are performed. The evaluation is done by a total of the similarities.

In the above-mentioned process, the rewritten block size and the neighborhood block size can be changed arbitrarily every hierarchy or every scan. As for the rewritten block size, if the rewritten block is magnified in the sub-hierarchy, the characteristic of a rough texture can be acquired. If the rewritten block is reduced in a higher hierarchy, the characteristic of a fine texture can be acquired. It is preferable that the neighborhood block size to influence computation time greatly is as small as possible. After synthesis of a new index image is finished by all scans carried out for all hierarchies, a new index image is output (1108).

There will be described new multi-dimensional texture generation in the new multi-dimensional texture generator 104 (304).

The new multi-dimensional texture generator 104 at first is supplied with the new index image output from the index image synthesizer 103 and a codebook with various quantization levels output from the reference multi-dimensional texture quantizer 102. A new multi-dimensional texture is generated by combining a codebook of an arbitrary quantization level with a new index image synthesized in an arbitrary hierarchy. However, if the new index image coincides with the codebook in the quantization level, they are combined with each other. If they are not coincide, it is necessary to rewrite the new index image in conformity with the quantization level of the codebook. In the case of rewriting, which pixel of the reference index image is referred to is checked, so that the new index image is corresponded with an index in the other quantization level.

By making the new multi-dimensional texture generator 104 output new textures of various quantization levels, it is possible to generate various texture images from an clear new texture image of clear detail to a coarse new texture image which seems to have reproduced only a rough pattern.

There will be described a new texture image generation of the new texture image converter 105 (305).

At first, a new multi-dimensional texture and a viewpoint/light source condition of the new texture image to be generated are input to the new texture image converter 105. A new texture image is drawn by referring to the codebook based on an index in the index image every pixel and extracting color information of a designated viewpoint/light source condition. After all pixels have been drawn, a new texture image is output.

The output new texture image can be applied to texture mapping to three-dimensional object. The normal of each polygon of the three-dimensional object and a relation between a viewpoint direction and a light source may be computed and the new texture image nearest to the corresponding viewpoint/light source may be mapped. Interpolation using a plurality of new texture images can generate a more realistic image. However, it is not necessary to always generate the new texture image to draw a pixel in units of a polygon. It is possible to draw the pixel while extracting color information of a pixel from the new multi-dimensional texture. Texture mapping using the new multi-dimensional texture permits an effective use of a memory.

Figure 14:
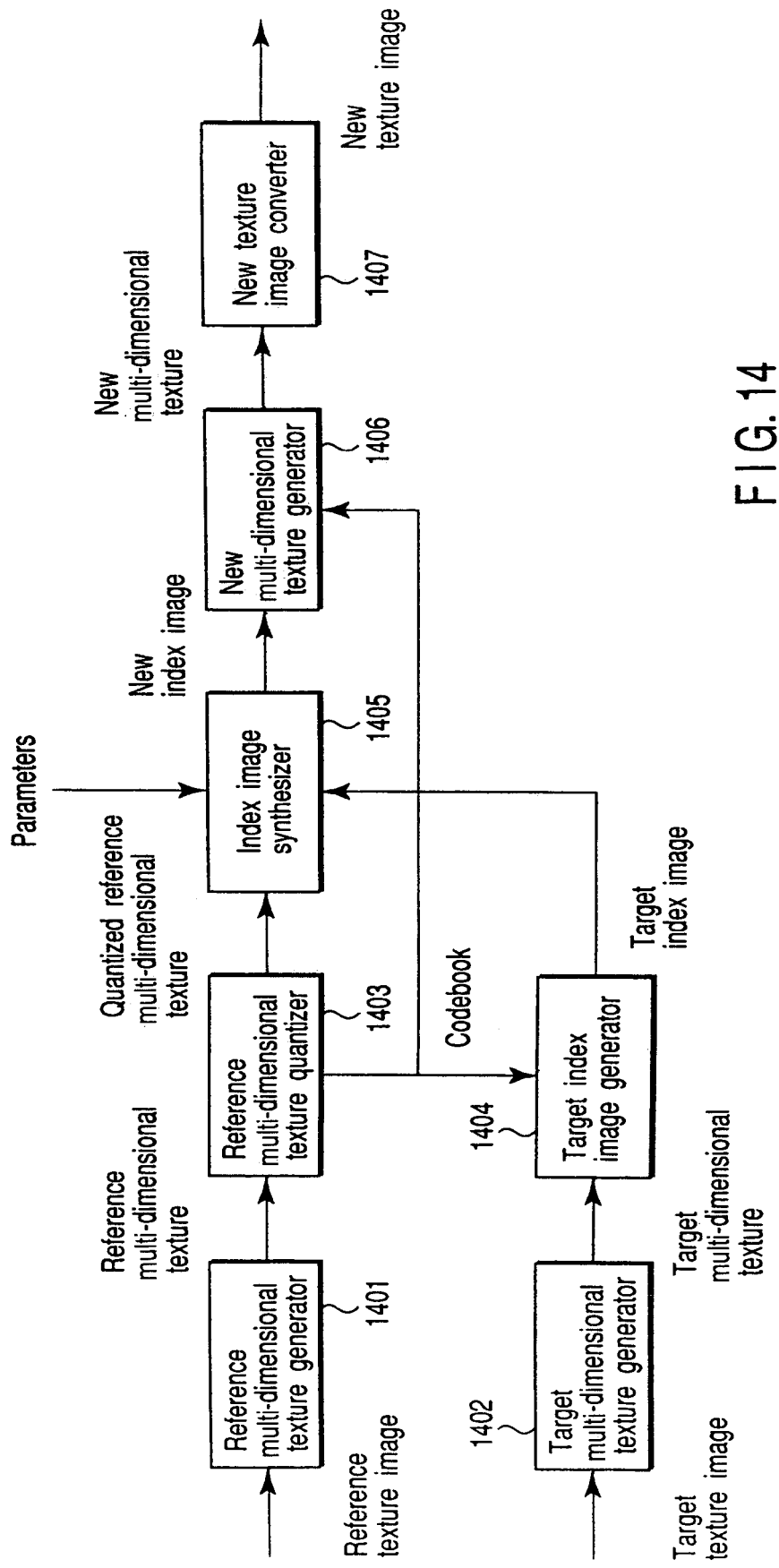
FIG. 14 is a block diagram of a multi-dimensional texture synthesis apparatus according to the second embodiment of the present invention.

FIG. 14 shows a configuration of a multi-dimensional texture synthesis apparatus according to the second embodiment of the present invention.

This apparatus adds a process using a target texture to the apparatus of the first embodiment. A reference multi-dimensional texture generator 1401 is similar to the reference multi-dimensional texture generator 101 used in the first embodiment. A reference multi-dimensional texture quantizer 1403 adds, to the reference multi-dimensional texture quantizer 102 used in the first embodiment, a process of outputting a codebook to a target index image generator 1404.

An index image synthesizer 1405 has a configuration similar to the index image synthesizer 103 of the first embodiment, but is modified so as to use a target index image in the similar pixel search. A new multi-dimensional texture generator 1406 and a new texture image converter 1407 have configurations similar to the new multi-dimensional texture generator 104 and the new texture image conversion 105 that are shown in the first embodiment, respectively.

The present embodiment differs from the first embodiment in existence of the target multi-dimensional texture generator 1402 and the target index image generator 1404. The target multi-dimensional texture generator 1402 generates a target multi-dimensional texture from one or more target texture images similarly to the reference multi-dimensional texture generator 1401. The target index image generator 1404 generates a target index image so as to correspond to the codebook output from the reference multi-dimensional texture quantizer 1403.

Figure 15:
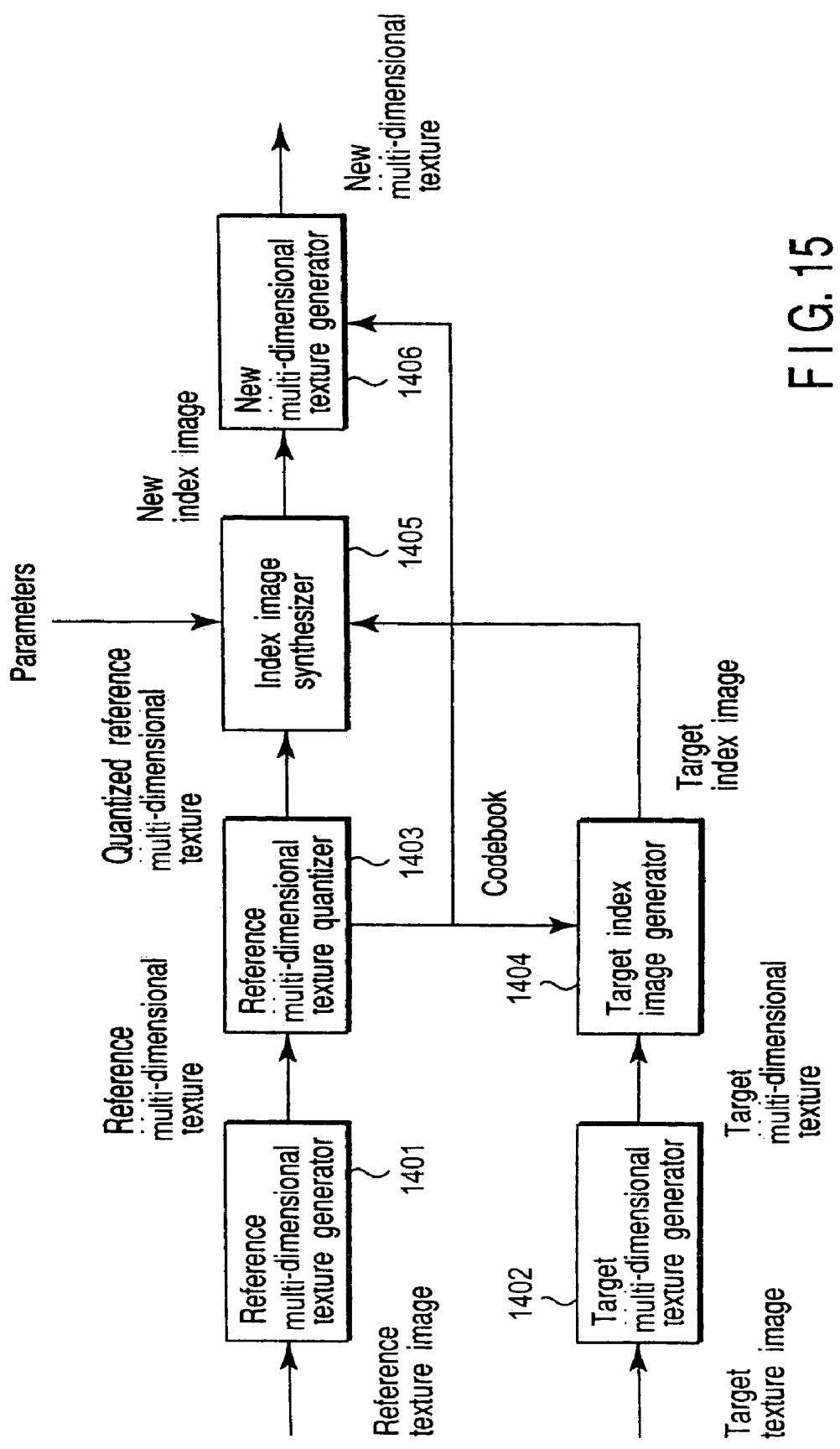
FIG. 15 is a block diagram of a multi-dimensional texture synthesis apparatus according to modification of the second embodiment.

FIG. 15 shows a configuration of a multi-dimensional texture synthesis apparatus concerning a modification of the second embodiment. In the second embodiment, like reference numerals are used to designate like structural elements corresponding to those in the embodiment of FIG. 14 and any further explanation is omitted for brevity's sake.

This apparatus has a configuration removing the new texture image converter 1407 from the apparatus of FIG. 14, and is used in the same manner as the multi-dimensional texture synthesis apparatus shown in FIG. 2 in the first embodiment. In other words, a new texture image is output as a final output image.

Figure 16:
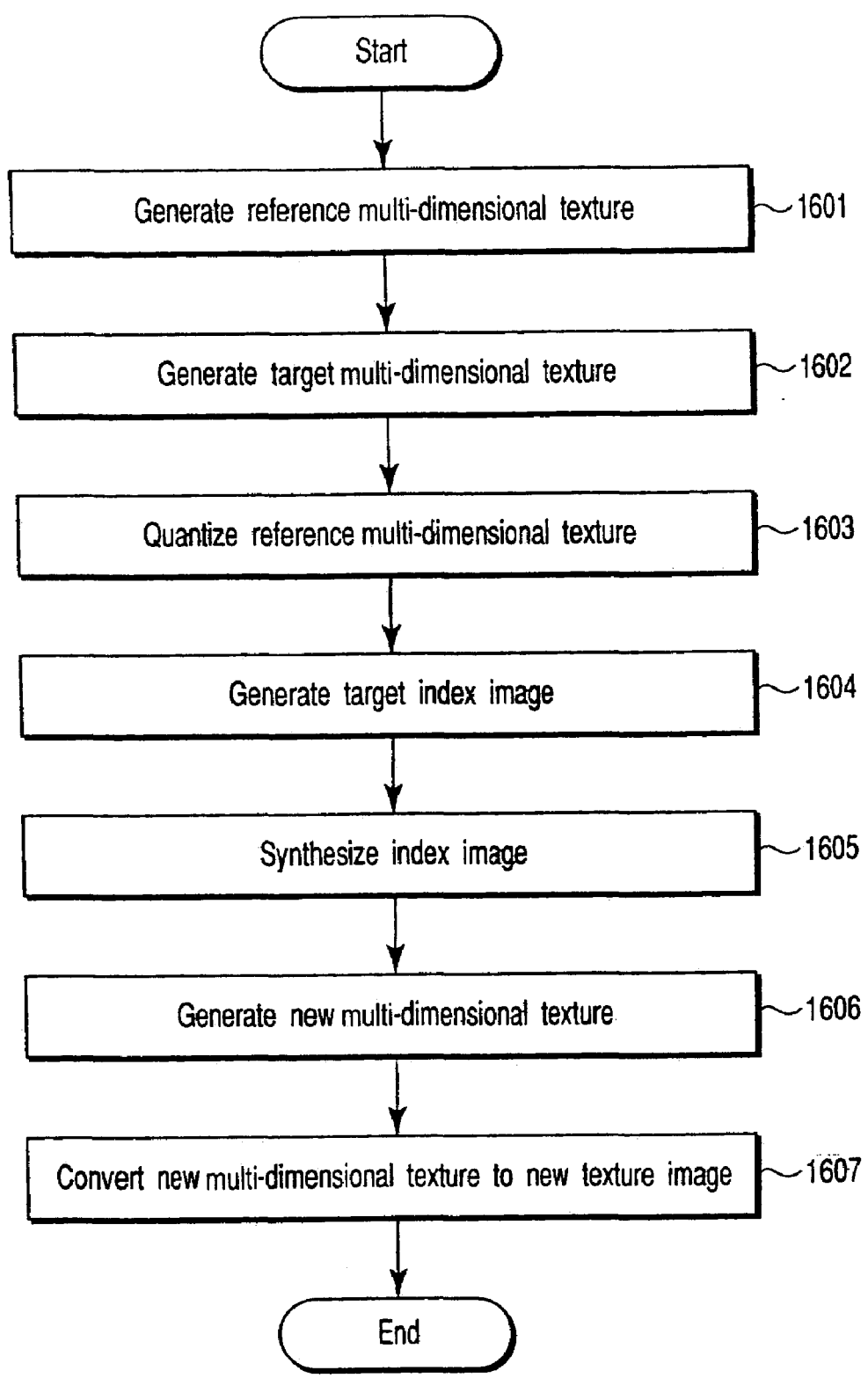
FIG. 16 is a flowchart showing a series of steps of a process executed with the multi-dimensional texture synthesis apparatus according to the second embodiment.

FIG. 16 shows a series of steps (1601, 1602, 1603, 1604, 1605, 1606 and 1607) of a process executed by the multi-dimensional texture synthesis apparatus according to the second embodiment shown in FIG. 14. Only the steps that differ from those of the first embodiment are described hereinafter.

In the present embodiment, one or more target texture images that are captured or drawn with different conditions are input to the target multi-dimensional texture generator 1402. The size of the target texture image assumes to be equal to a required size of the new texture image.

The target multi-dimensional texture generator 1402 generates a target multi-dimensional texture according to a flowchart similar to that of FIG. 4. However, the format of multi-dimensional pixel data assumes to be similar to that of the reference multi-dimensional texture generator 1401. Color information of each of target texture images to be targeted at the positions of the viewpoint and light source is written in each of multi-dimensional pixel data corresponding to the positions of the viewpoint and light source, respectively. The data is not written at the positions of the viewpoint and light source not to be targeted.

To the target index image generator 1404 is input at first the target multi-dimensional texture and the codebook generated by the reference multi-dimensional texture quantizer 1403. Next, the codebook of the target multi-dimensional texture is substituted with the codebook of the reference multi-dimensional texture, and the index is rewritten. When the index is rewritten, the multi-dimensional pixel data generated by the target multi-dimensional texture generator 1402 is compared with the multi-dimensional pixel data in the codebook to assign an index corresponding to the multi-dimensional pixel data of the highest similarity. However, the similarity is evaluated by a SAD (Sum of Absolute Difference), a correlation value or an inner product without including the positions of the view point and light source not to be targeted.

The above process is done for a plurality of codebooks according to quantization levels input from the reference multi-dimensional texture quantizer 1403 to output a target index image according to each quantization level. The index image synthesizer 1405 performs a process to input a target index image and a similar pixel search process using the target index image as well as the process similar to that of the index image synthesizer 103 shown in the first embodiment.

Figure 17:
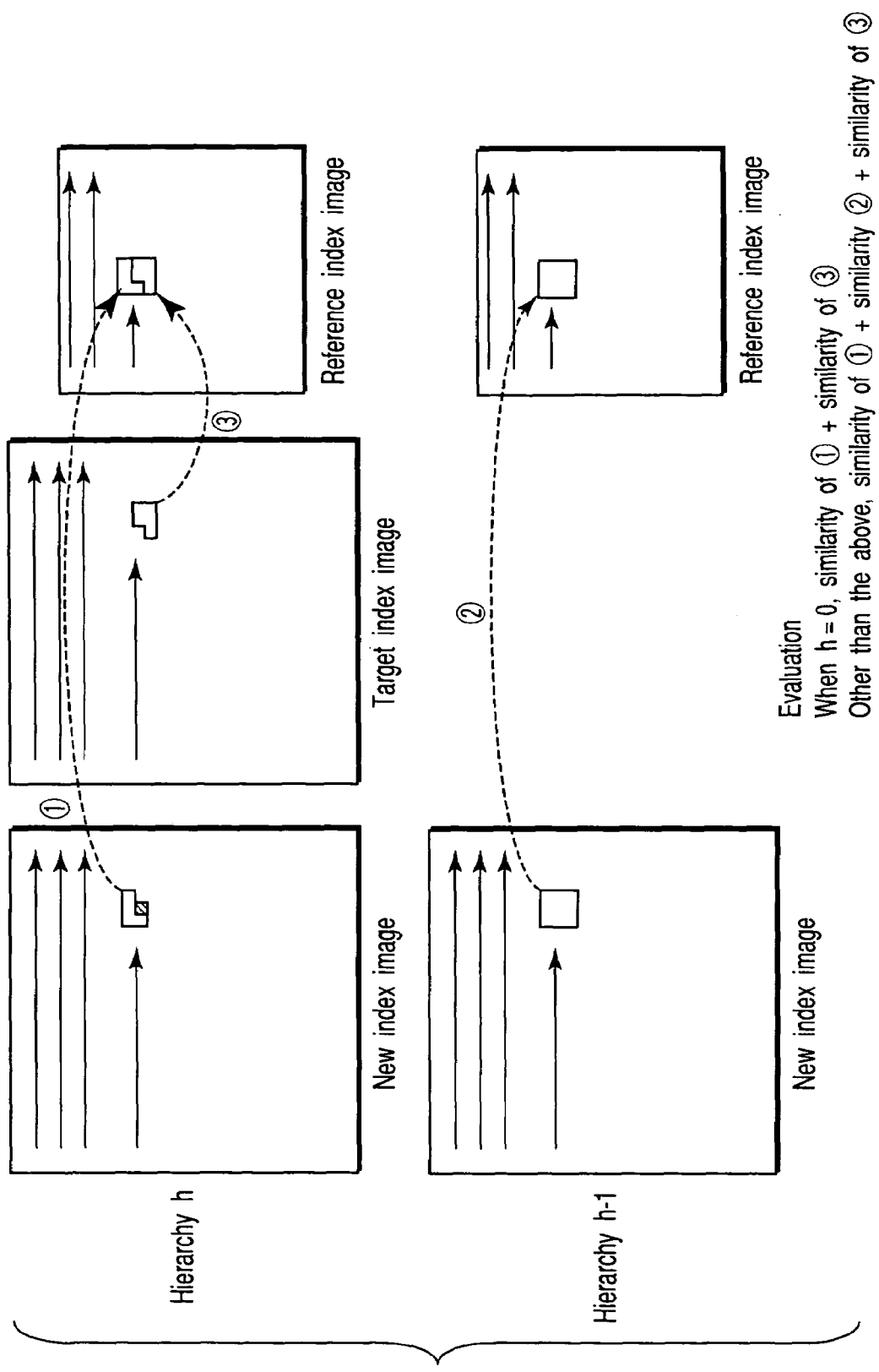
FIG. 17 is a diagram for explaining a similar pixel search in hierarchy h.

FIG. 17 is a diagram for explaining a similar pixel search for the hierarchy h. The target index image uses an image of a quantization level in the hierarchy h. When h=0, the rectangular search is performed with the hierarchy 0 to evaluate by merely the similarity.

In other words, evaluation of the similarity is done by a total of similarity ① between a block of the new index image and a block of the reference index image and similarity ③ between a block of the target index image and a block of the reference index image.

When it is not h=0, the rectangular search is performed in the hierarchy h and the hierarchy h−1 so that the similarity is evaluated by a total of the similarities, that is, similarities ①, ②, and ③. The hierarchy h is subjected to the rectangular search (b) as shown in FIG. 12B.

The rewritten block 1221 in the rectangular block uses a block of the new index image. The non-rewritten block 1222 uses the target index image. The hierarchy h−1 is subjected to the rectangular search (a) as shown in FIG. 12B. The other process is similar to that of the first embodiment.

(Third Embodiment)

As described above, the target index image is generated by comparing the reference multi-dimensional texture with the target multi-dimensional texture in the codebook.

A purpose to use a target multi-dimensional texture is to give a hint to bring as close to the pattern and raw material feeling that a user hopes as possible when synthesizing a new multi-dimensional texture larger than a reference multi-dimensional texture from the reference multi-dimensional texture. Accordingly, the target multi-dimensional texture does not have to be always acquired under many conditions, unlike the reference multi-dimensional texture.

In the capture condition shown in FIG. 5, for example, even if the reference multi-dimensional texture is captured at intervals of 20 degrees in θ, the target multi-dimensional texture may be captured at intervals of 40 degrees in θ. In order words, it is how to use a target multi-dimensional texture to create a large multi-dimensional texture after sunthesis with a little number of samples. Accordingly, the arrays of multi-dimensional pixel data included in the codebooks of the reference multi-dimensional texture and target multi-dimensional texture often differ from each other. Therefore, in the case of comparison between the multi-comparison between the multi-dimensional pixel data, it is necessary to extract parts of identical acquisition condition, and evaluate similarity therebetween.

Further, the reference multi-dimensional texture and target multi-dimensional texture do not need to be always the same material. In that case, a filtering process of codebook is necessary in a pre-stage for evaluating similarity between the codebooks. For example, assume that a red sweater of a check pattern is prepared as a reference multi-dimensional texture, and a blue sweater of polka-dot pattern is prepared as a target multi-dimensional texture. The polka dot pattern is intended as a target, but the color of material is completely different. If the red part of the reference multi-dimensional texture should be assigned to the blue part of the target multi-dimensional texture, a pre-process to convert the blue part of the target multi-dimensional texture into red is necessary.

The present embodiment is a modification of the index image synthesizer used for the first and second embodiments. The multi-dimensional texture synthesis apparatus of the present embodiment has a configuration approximately similar to the apparatus of FIG. 1 as described in the first embodiment or the apparatus of FIG. 14 as described in the second embodiment. The other components except for the index image synthesizer have the same functions as those of the first embodiment or the second embodiment.

Figure 18:
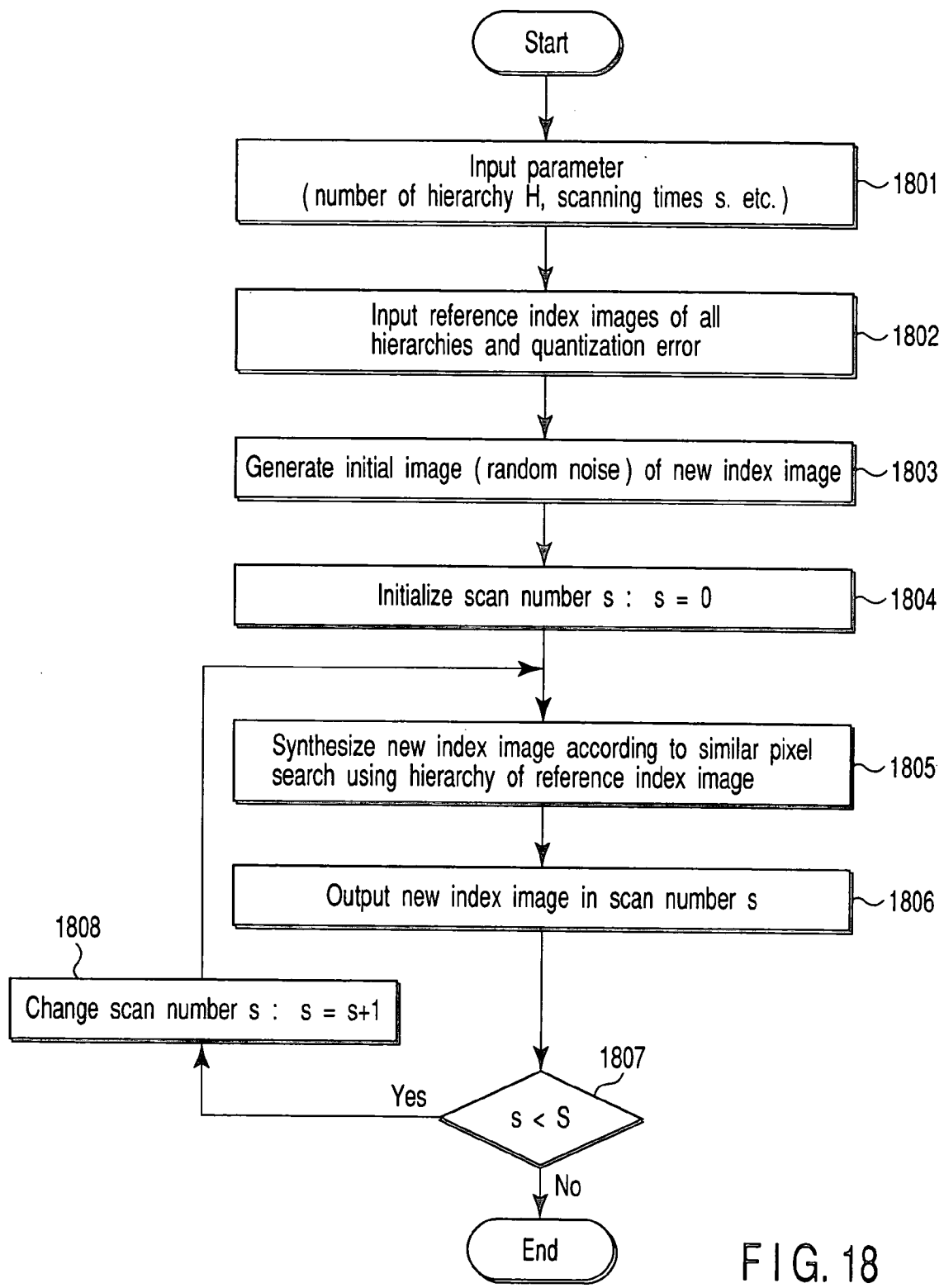
FIG. 18 is a flowchart of index image synthesis according to the third embodiment of the present invention.

FIG. 18 is a flowchart of the index image synthesis carried out by the index image synthesizer. At first, parameters are input to the index image synthesizer concerning the present embodiment (1801). Because this apparatus does not scan every hierarchy, only one scan may be set as a parameter. The parameters other than the above parameter are similar to those of the first embodiment or the second embodiment.

The reference index images of all the hierarchs and a quantization error are input (1802). In this apparatus, two or more reference index images whose quantization errors differ to each other are used to synthesize a single new index image. The quantization error of each hierarchy is used for performing approximate similarity evaluation. When there is a target index image, the target index image also is input.

Next, the initial image of the new index image is generated (1803). This is a noise image similar to that of the first embodiment or the second embodiment.

The scan number s is initialized (s=0). Index rewriting is performed by the similar pixel search (described hereinafter) while the new index image is scanned repeatedly till the scan number becomes S−1 (1804, 1807, 1808).

In synthesis of the new index image in each scan (1805), the new index image is rewritten from the upper left to the lower-right every designated block size. In rewriting of the index, the similar pixel search is performed referring to the most significant one (the smallest quantization error) of the input reference index images. The searching method is similar to that of the first embodiment and the second embodiment, but an evaluation method differs from them. In the similar pixel search in the present embodiment, the evaluation is performed using hierarchies of two or more reference index images of different quantization errors.

Figure 19:
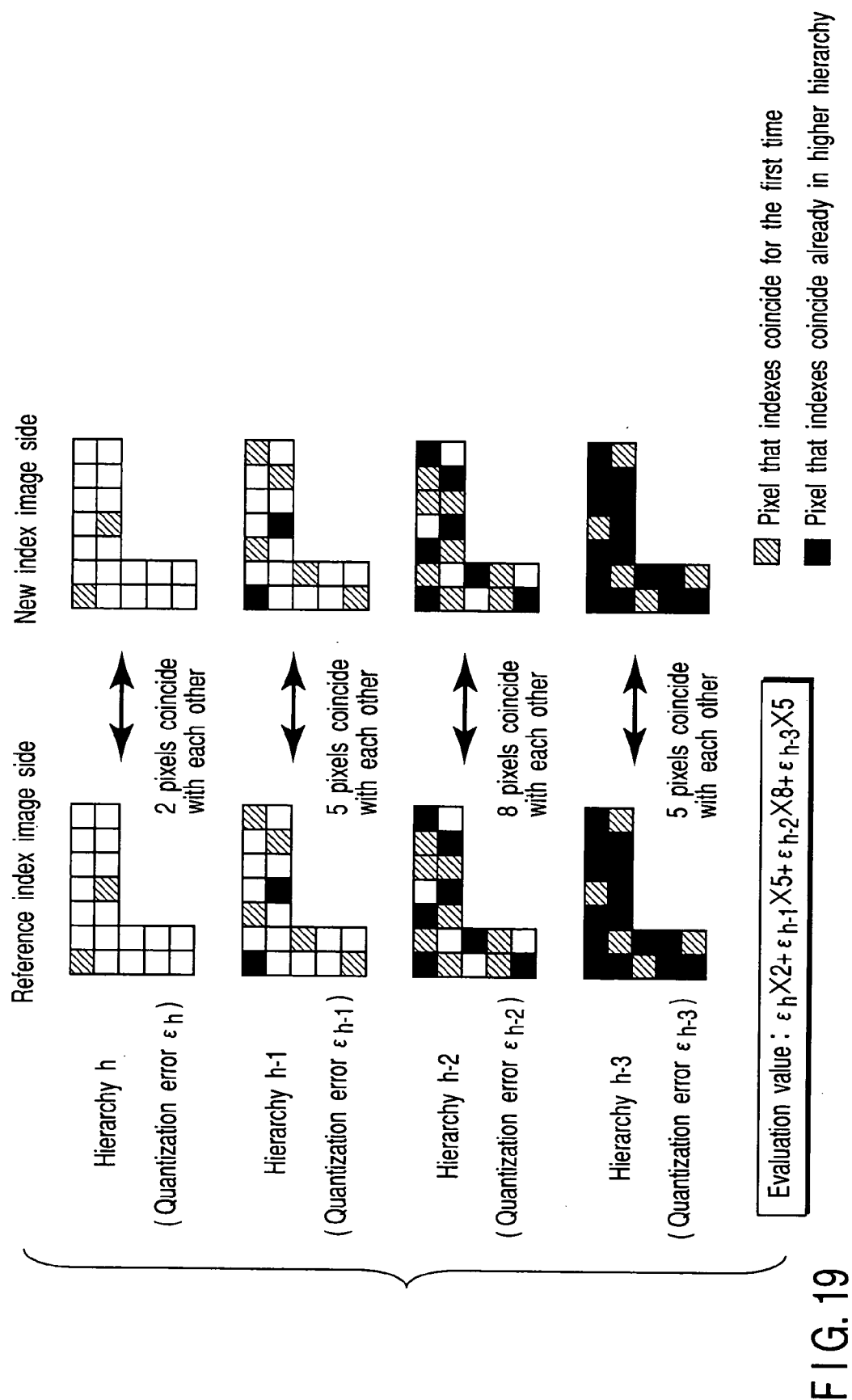
FIG. 19 is a diagram for explaining resemblance evaluation of a pixel.

An example of similarity evaluation of pixels is shown in FIG. 19.

In order to evaluate the similarity between a block (L-shaped or square-shaped block) adjacent to a to-be-rewritten block and a block of the same shape of a reference index image or a target index image, the index image is referred to in order from the reference index image of the higher hierarchy or the target index image.

When the indexes of certain pixels of two blocks which are compared with each other coincide for the first time at a certain hierarchy, the quantization error of the hierarchy assumes to be an approximate error in that pixel. Such an approximate error is acquired for all pixels of the block to evaluate the similarity between the blocks. When synthesis of the new index image in each scan is completed, the new index image is output (1806).

(Fourth Embodiment)

According to a multi-dimensional texture synthesis apparatus according to the first embodiment shown in FIG. 20, a group of texture images captured or drawn in a plurality of different conditions is input.

A quantization process, a synthesis process, a transform process, and so on are subjected to the group of texture images to output a texture image. According to this apparatus, a multi-dimensional texture generator 1601 derives image information of pixels in the same position and gathers them to generate a multi-dimensional texture. The multi-dimensional texture generator 1601 is connected to a multi-dimensional texture data storage unit 102 to store the generated multi-dimensional texture therein.

This multi-dimensional texture data storage unit 1602 is connected to a multi-dimensional texture quantizer 1603, an index image synthesis unit 1604 and a texture image generator 1605. The multi-dimensional texture quantizer 1603 subjects the multi-dimensional texture derived from the multi-dimensional texture data storage unit 1602 to vector quantization according to one or more quantization levels, and stores the quantized multi-dimensional texture in the multi-dimensional texture data storage unit 1602. An index image synthesis unit 1604 repeats similar pixel search according to control data or control image data using the multi-dimensional texture of a plurality of materials derived from the multi-dimensional texture data storage unit 1602, to synthesize a new index image of an arbitrary size and an option design. The texture image generator 1606 converts the multi-dimensional texture derived from the multi-dimensional texture data storage unit 1602 to one or more texture images corresponding to a specific acquisition condition or creation condition.

A generation method of multi-dimensional texture, data structure of multi-dimensional texture, a quantization method of multi-dimensional texture and an index image synthesis method are fundamentally similar to the previous embodiment.

Figure 21:
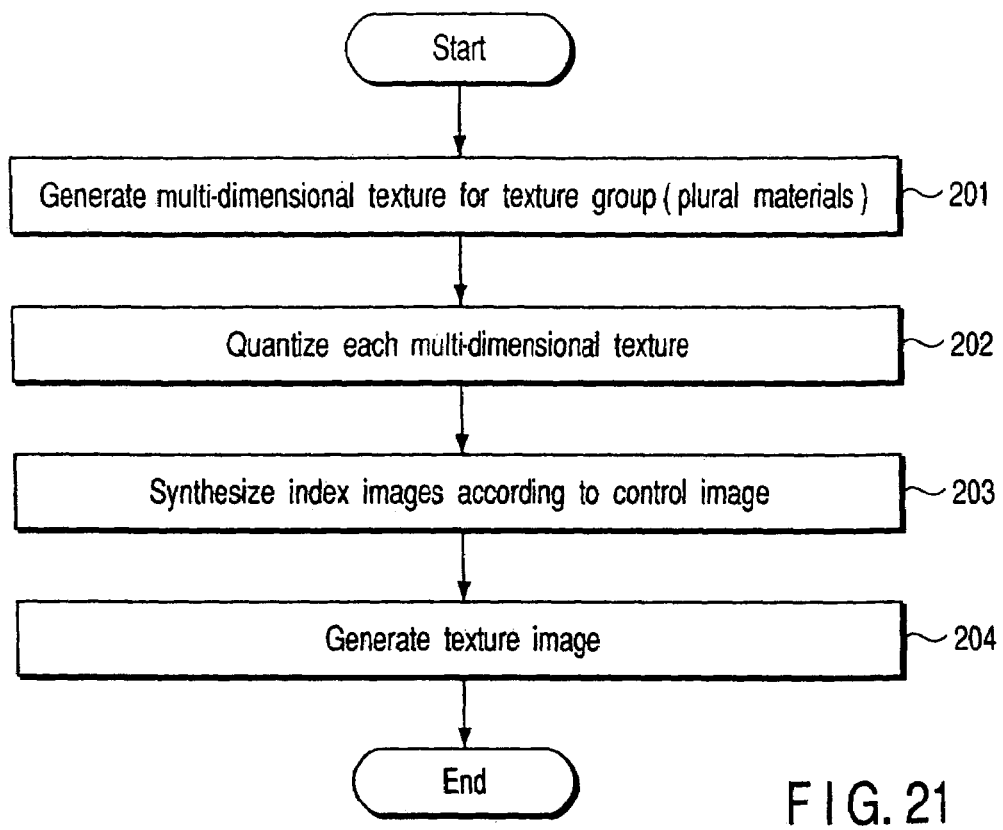
FIG. 21 shows a process flow of the multi-dimensional texture synthesis apparatus according to FIG. 20.

FIG. 21 shows a process carried out with the multi-dimensional texture synthesis apparatus shown in FIG. 20. The process will be explained hereinafter.

Figure 23:
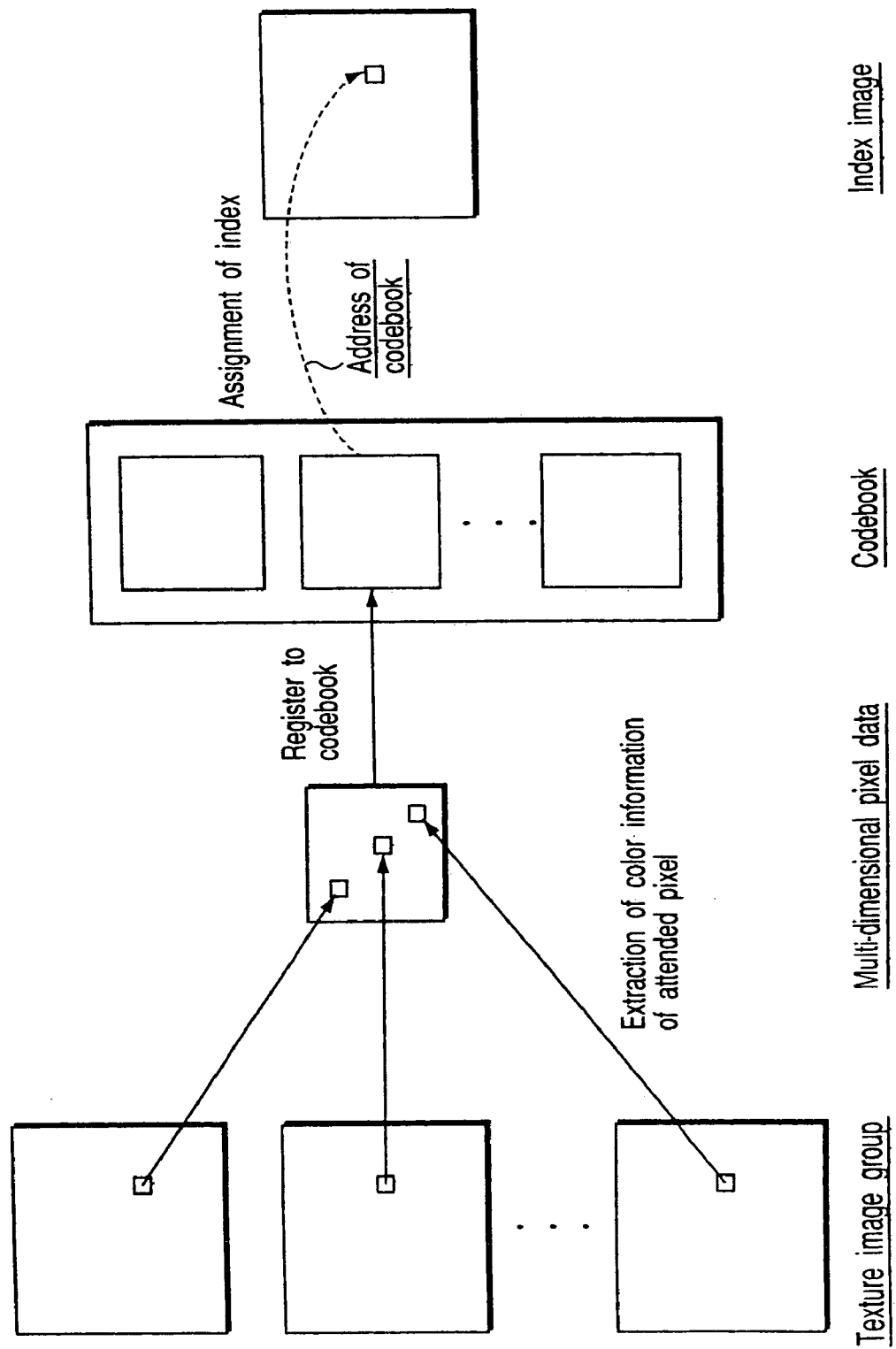
FIG. 23 is a diagram to explain a multi-dimensional texture generation method.

A texture group input to the multi-dimensional texture generator 1601 of this apparatus is acquired with various conditions (a viewing point and a light source) as explained referring to FIG. 23. In the present embodiment, (W×X)×(Y×Z) texture images acquired by combination of all of W×X viewing points and Y×Z light sources are input to the reference multi-dimensional texture generator 1601 as reference texture images.

FIG. 23 shows a state that extracts color information of pixels located in the same position from a plurality of reference texture images of the texture image set and generates multi-dimension pixel data. According to this, from (W×X)×(Y×Z) reference texture images are derived color components of pixels located in the same position. The color components are gathered to a single data in conformity with a given format, and the multi-dimensional texture data is generated for each of R, G and B (step 404). That is to say, the color components of pixels located in the same position which are extracted from a plurality of reference texture images respectively are pasted to (W×X)×(Y×Z) pixels sequentially to generate multi-dimensional pixel data. This process is similar to the reference multi-dimensional texture generation method explained in the previous embodiment. However, in this embodiment, whenever the multi-dimensional texture of one material is generated, it can be stored in the multi-dimensional texture data storage unit 1602 resulting in permitting to generate multi-dimensional textures of a plurality of materials.

The generated multi-dimensional pixel data are stored in a codebook (step 405), and an index is assigned to the remarkable pixel (i, j) (step 406). Then, all pixels are remarked (step 407). When the process completes for all pixels, the multi-dimensional texture generation process is ended.

Figure 24:
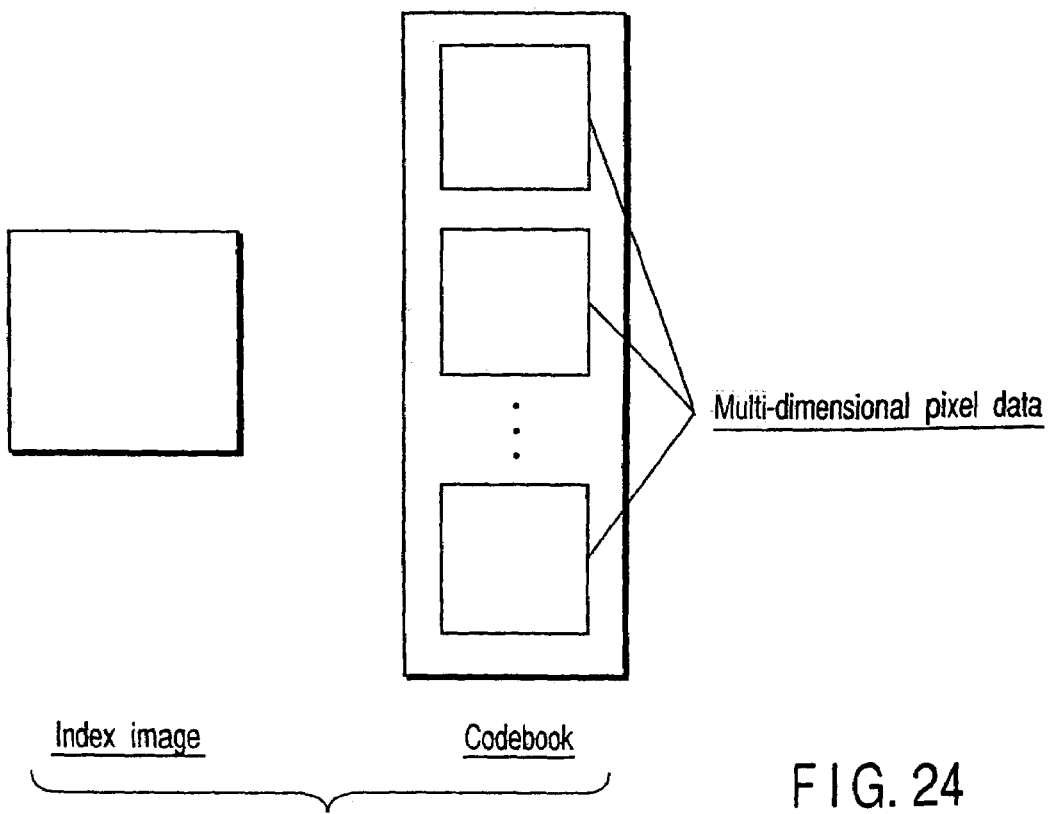
FIG. 24 shows a basic data structure of a multi-dimensional texture.
Figure 22:
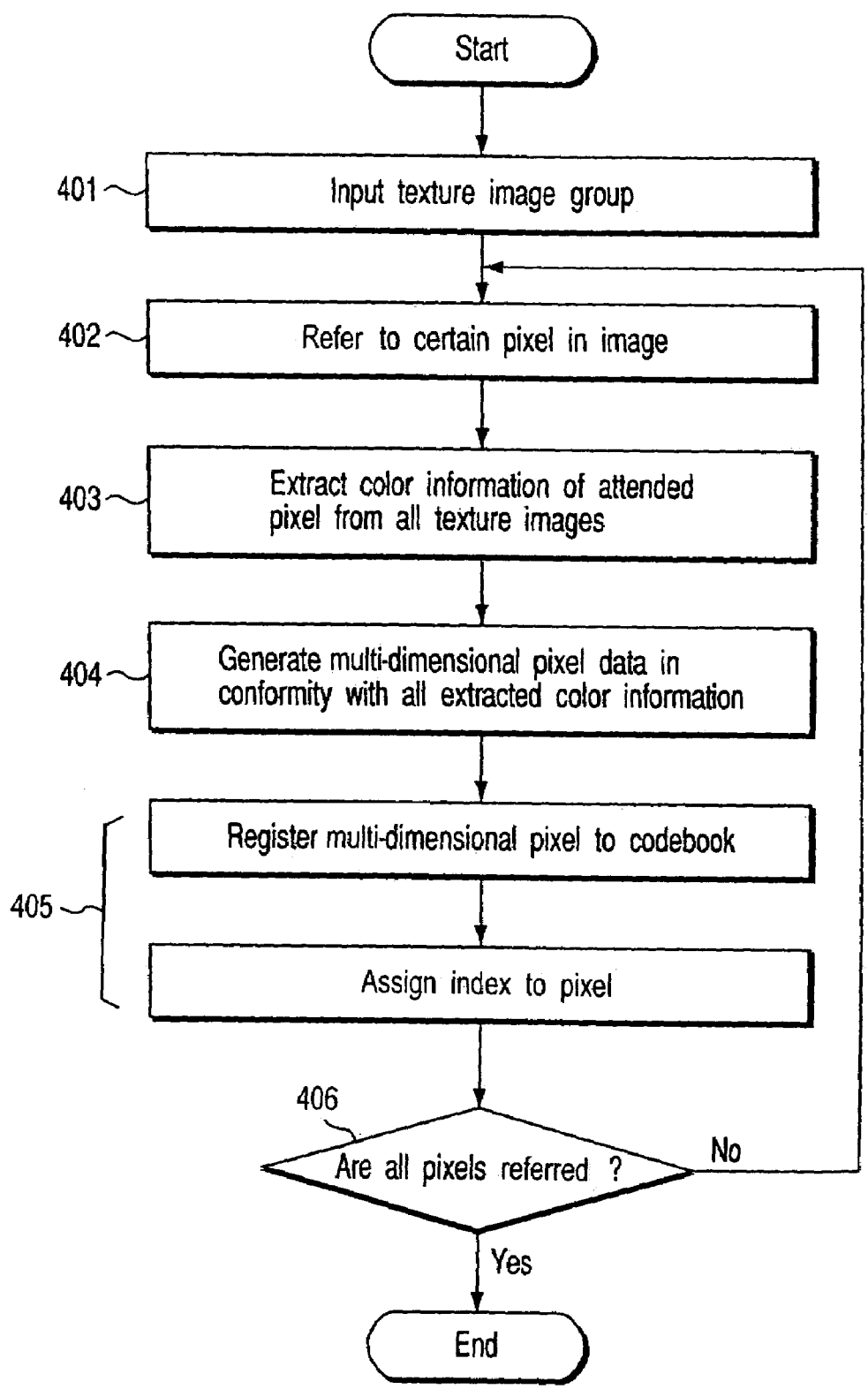
FIG. 22 shows a process flow of a multi-dimensional texture generator.

FIG. 24 shows a basic data structure of multi-dimensional texture. The multi-dimensional texture comprises a codebook and a reference index image. The codebook is configured by collection of data as referred to as multi-dimensional pixel data (as described later). The reference index image is configured by collection of index information to designate multi-dimensional pixel data in the codebook.

In the present embodiment, the reference index image and codebook are created for the color components of R, G and B. A multi-dimensional texture handling all of R, G and B components for a lump and a multi-dimensional texture that a luminance component and a color component are separated can be created in the same manner. The multi-dimensional pixel data is one obtained by collecting color information in a pixel. Assuming that the high-multi-dimensional pixel data of R, G and B components are R(l), G(m) and B(n), respectively. These are multi-dimensional pixel data corresponding to indexes l, m and n, respectively. Only one codebook is shown in FIG. 24. However, codebooks of R, G and B components are prepared as described in the previous embodiment. The codebook sizes of R, G and B components are L, M and N, respectively. The multi-dimensional pixel data increasingly diversifies as the codebook size increases.

Figure 25:
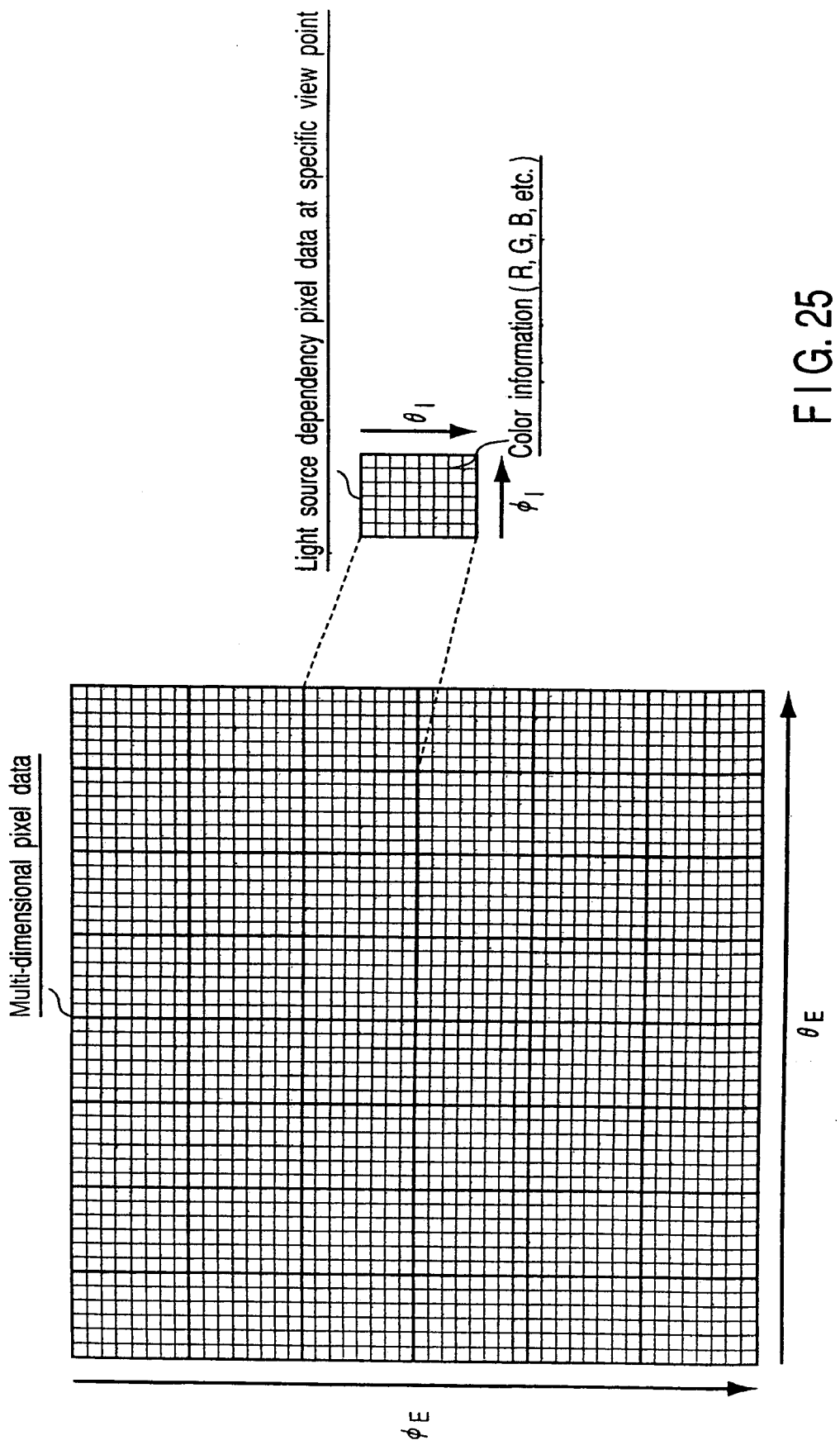
FIG. 25 shows a format example of multi-dimensional pixel data.

FIG. 25 shows a format example of multi-dimensional pixel data. In other words, FIG. 25 shows a format made by blocking light source dependant pixel data in a specific viewing point that are arranged in quadrature axis θI and ordinate axis ϕI, and arranging the blocks in quadrature axis ϕE and ordinate axis θE every view point. The data structure of multi-dimensional texture and the format of multi-dimensional pixel data are similar to the previous embodiment.

Figure 26:
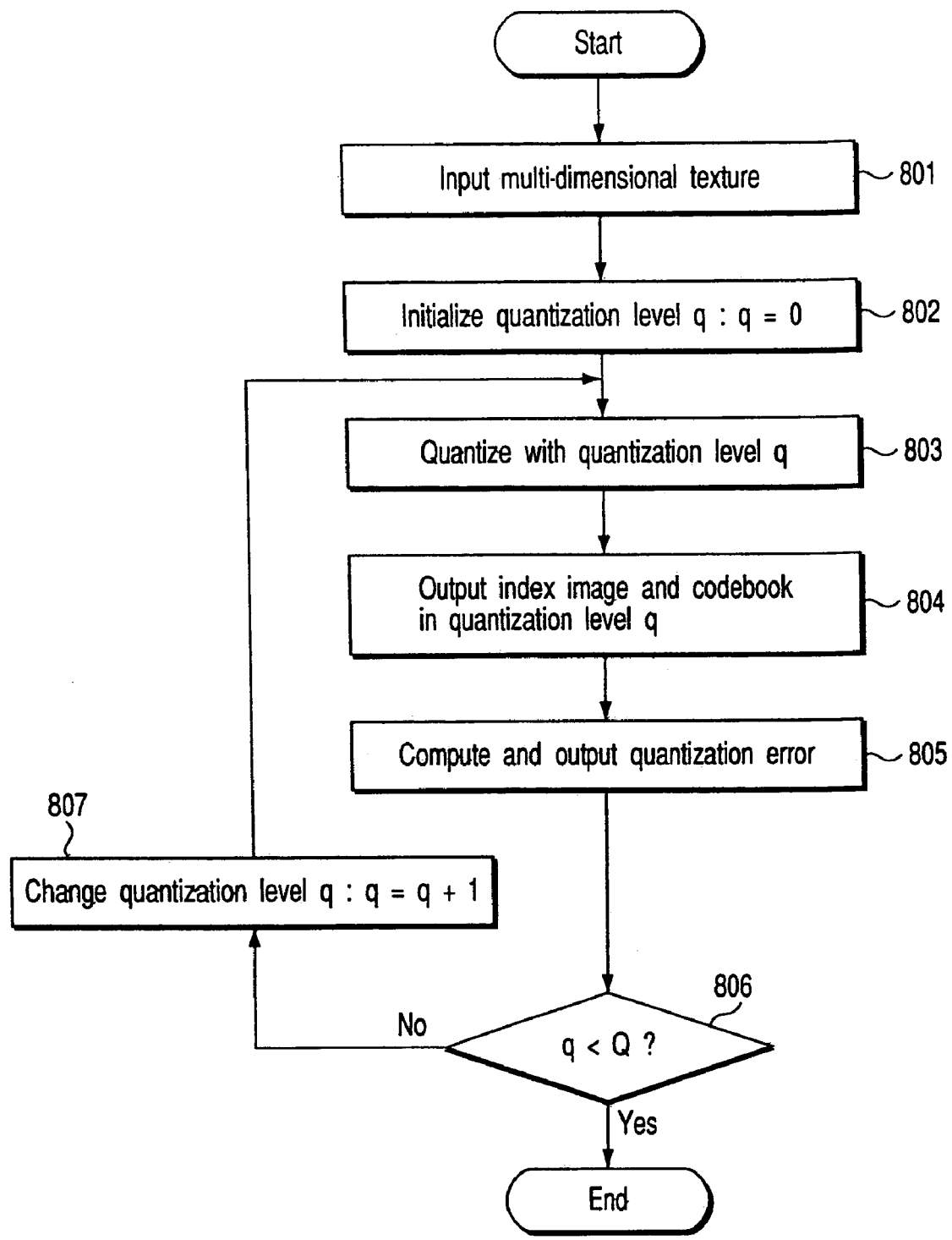
FIG. 26 shows a process flow of a multi-dimensional texture quantizer.

FIG. 26 shows a procedure of multi-dimensional texture quantization in the multi-dimensional texture quantizer 103 (202). According to this, at first a reference multi-dimensional texture is input (801). A quantization level q is initialized (802) and quantization is started in the quantization level q (803). An index image and a codebook in the quantization level q are output (804). In quantization level, the codebook size is specified. In this case, the codebook size increases with increase of the value q. In step 805, a quantization error is computed and output.

The quantization process completes in a quantization level that the codebook size equals to the number of pixels of the reference texture image (806). When q<Q is "No", the quantization level is changed or incremented by 1 (807).

Figure 27:
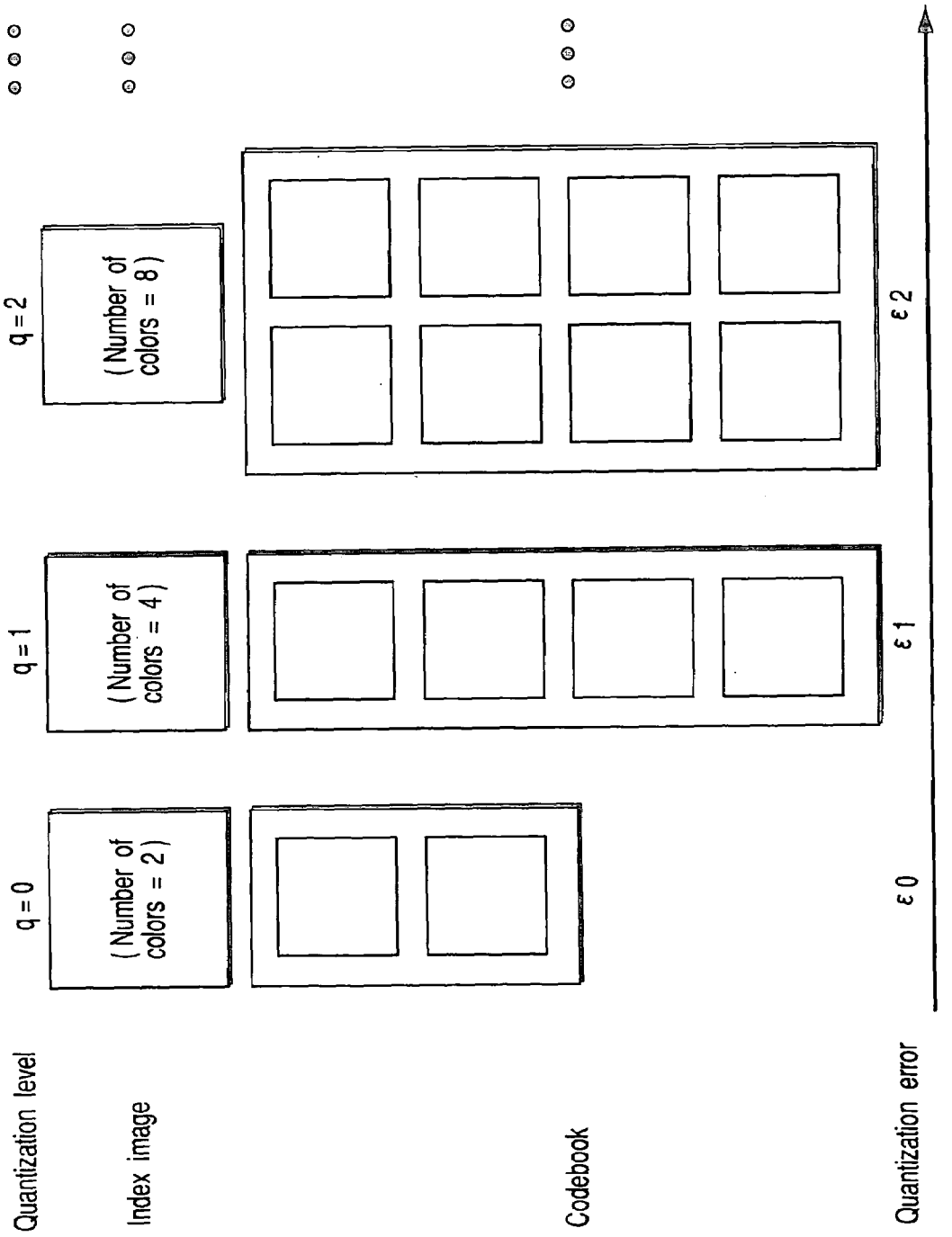
FIG. 27 shows a multi-dimensional texture with a hierarchical structure.

FIG. 27 shows configuration of the quantized reference multi-dimensional texture output from the multi-dimensional texture quantizer 103. The R, G and B components hold respective reference multi-dimensional textures every quantization level, distinctly. The codebook size increases as q increases. The reference multi-dimensional texture is expressed in hierarchy.

The above process is similar to that of the reference multi-dimensional texture quantizer described by the previous embodiment. However, in the present embodiment, the multi-dimensional texture is derived from the multi-dimensional texture data storage unit 102. The process for storing the quantized multi-dimensional texture in the multi-dimensional texture data storage unit 102 can repeated. For this reason, the multi-dimensional textures of a plurality of materials can be quantized.

Figure 28:
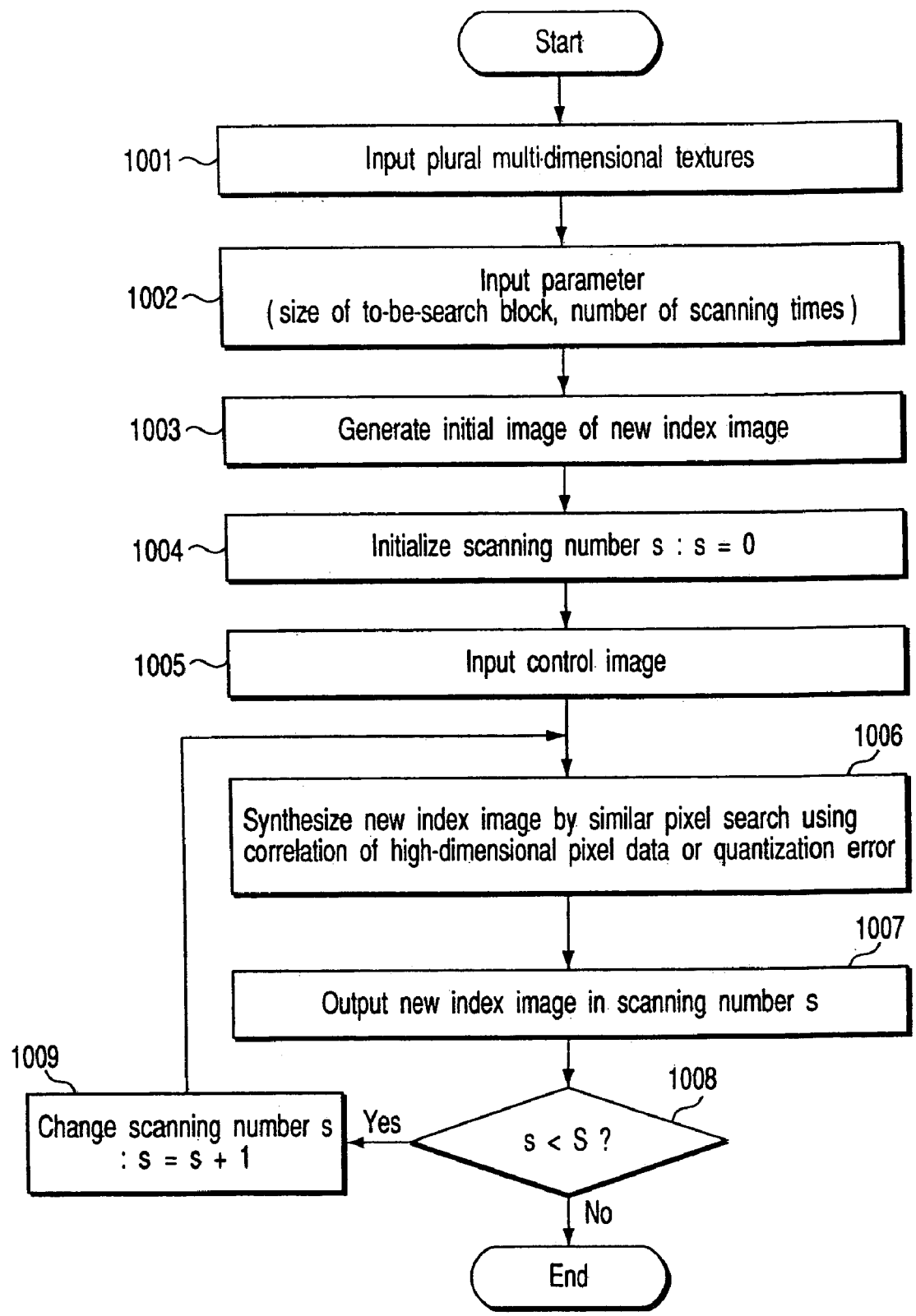
FIG. 28 shows a process flow of an index image composition unit.

FIG. 28 shows a procedure of index image synthesis (203) in the index image synthesizer 104. According to this, at first a plurality of multi-dimensional textures are input (1001). A parameter, for example, a search block size, the number of scanning times s are input (1002). An initial image of a new index image is generated (1003). In other words, a noise image to which indexes existing in the reference index image are randomly assigned is generated as the initial image of new index image.

The scanning number s is initialized (s=0) (1004), and a control image is input (1005). A new index image is synthesized by a similar pixel search using correlation of multi-dimensional pixel data or a quantization error (1006). The new index image in the scanning number s is output (1007). It is determined whether or not s<S (step 1008). If s<S, the scanning number s is changed as s=s+1 (1009). Then, steps 1005–1007 are repeated until s<S is not concluded.

Figure 29:
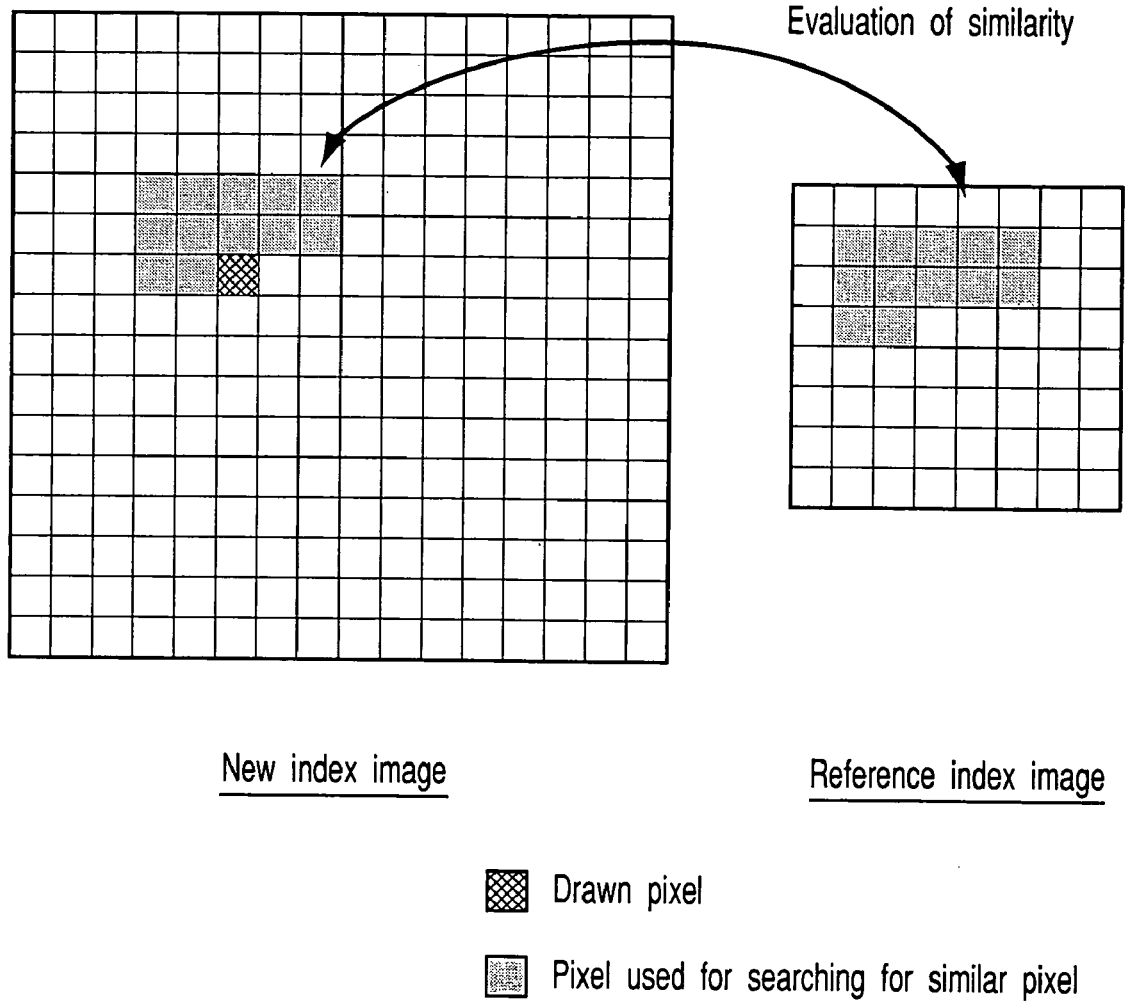
FIG. 29 is a diagram to explain a method of a similar pixel search.

In other words, L-shaped block as shown in FIG. 29 is used for a similar pixel search to rewrite an index as described below while the new index image is scanned repeatedly till the scanning number s becomes not more than S. For an evaluation value in the similar pixel search is used an approximate evaluation value dependent on a quantization error, by using SAD (Sum of Absolute Difference) between the multi-dimensional pixel data or a hierarchy of a multi-dimensional texture corresponding to a quantization level as shown in FIG. 30 is used.

Figure 31:
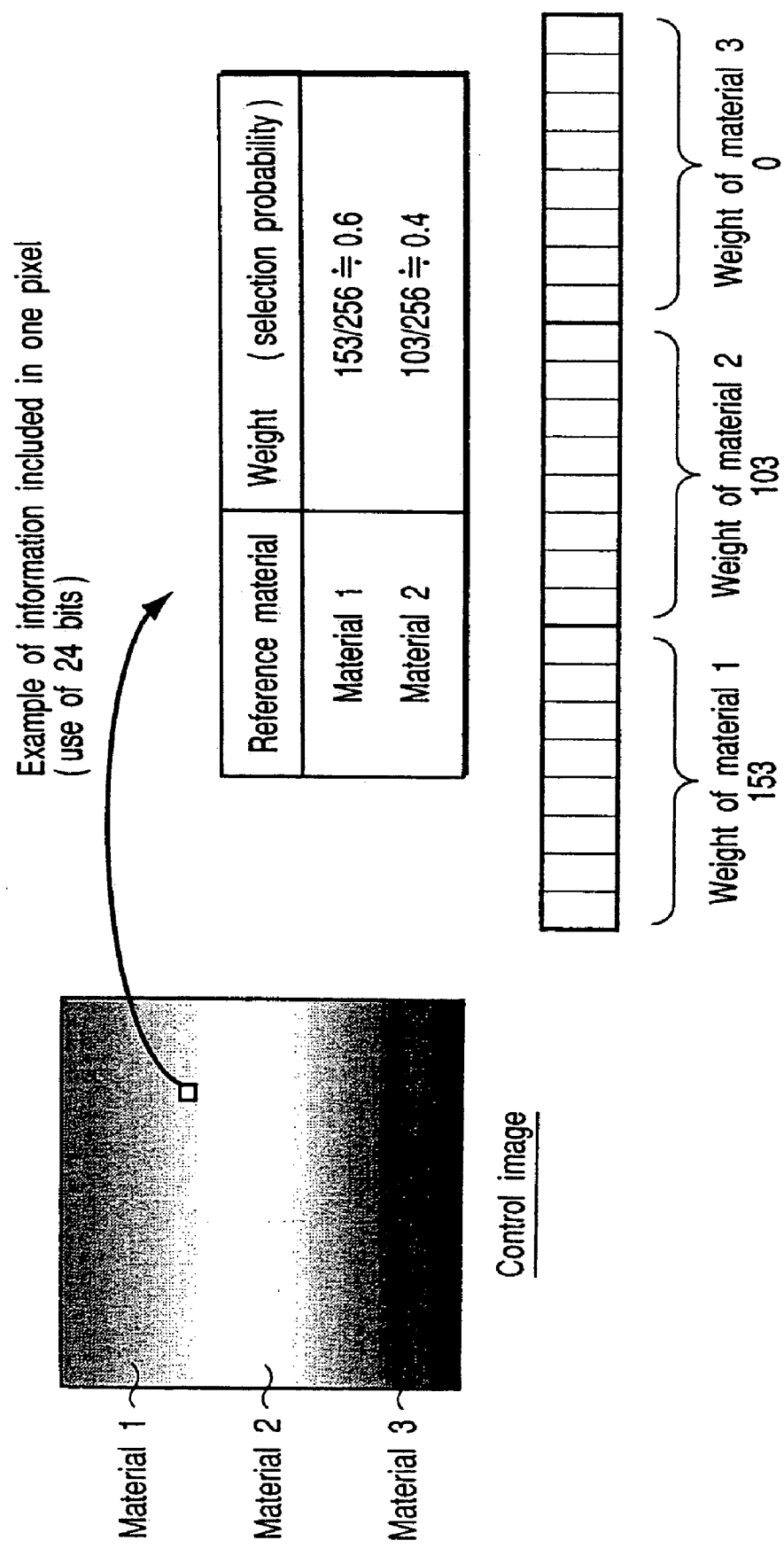
FIG. 31 is a diagram to explain data included in a control image.

Information included in the control image input to the index image composition unit 104 is shown in FIG. 31. The control image is a colored image expressing control data of each pixel at 24 bits. FIG. 31 is an example referring to three kinds of material. A probability that each material is selected every 8 bits or a weighting factor is included in the control image. The imaging of the control data provides a merit that a user (a designer) can visualize a synthesis result and a merit that an image can be controlled with such sense to sketch an object. The control data of each pixel includes a material ID to specify a material to be referred in a similar pixel search, a weighted parameter to specify how much probability each material is selected, when a plurality of materials are referred to, or a selection probability.

Figure 32:
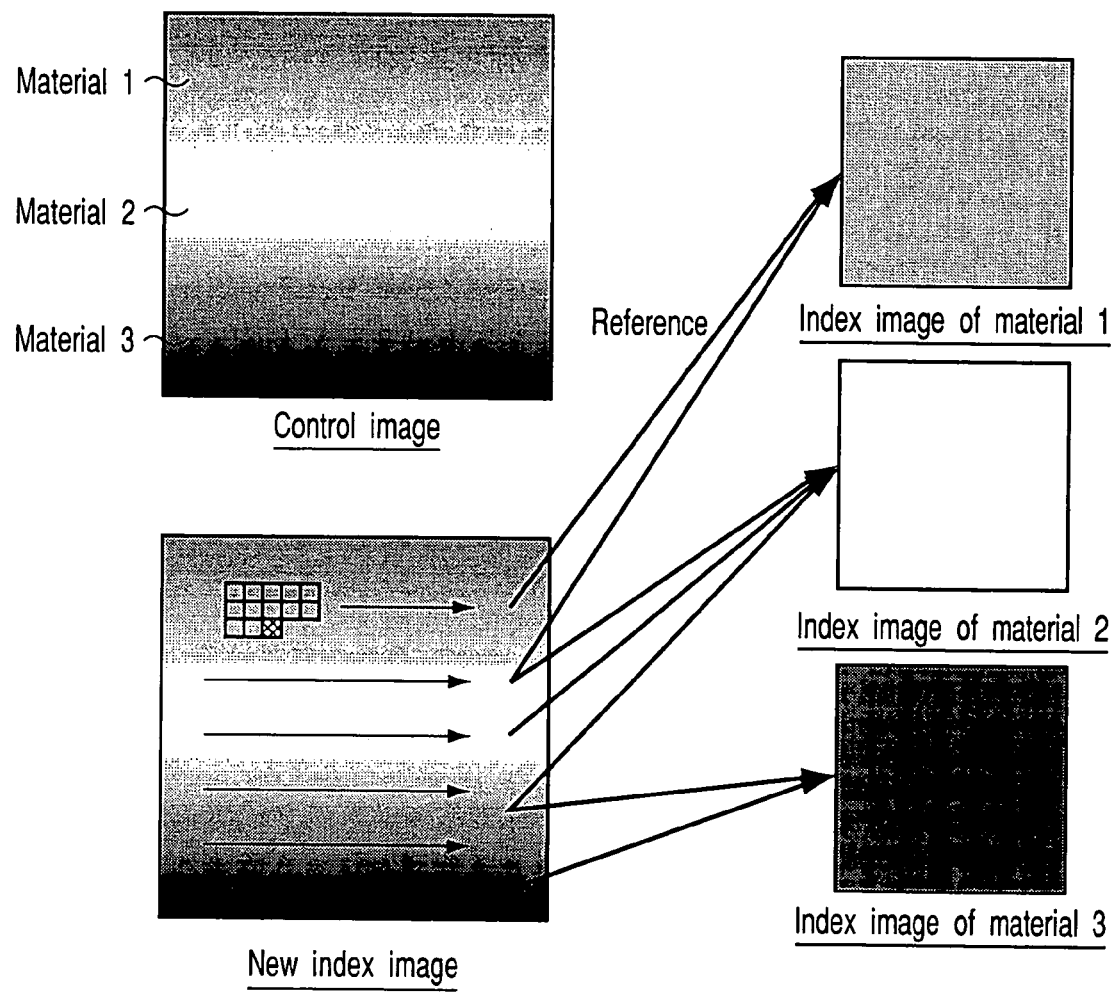
FIG. 32 is a diagram to explain a synthesis method to refer to a plurality of materials based on a control image.

FIG. 32 shows how each material is referred to according to the control image in drawing an index by a similar pixel. The material is specified so that a material 1 is referred to in the upper part of the image, a material 2 in the central part thereof, and a material 3 in the lower part thereof. In a boundary part between materials 1 and 2, both materials are referred to so that the boundary between materials is smoothly connected without sense of incongruity. The material is specified selectively so as to carry out a process of drawing an index.

Figure 33:
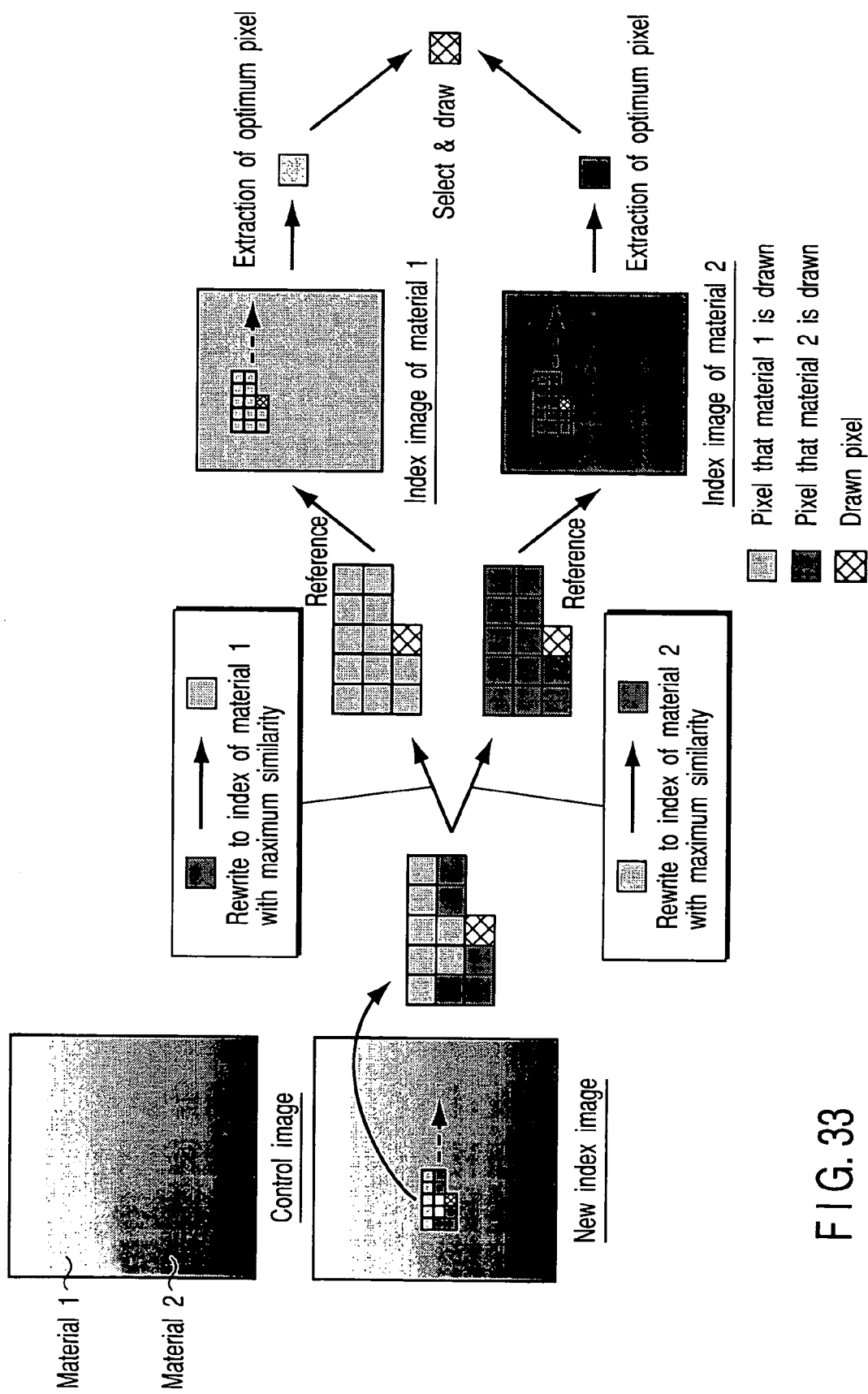
FIG. 33 is a diagram to explain a method of searching for an optimum index in referring to a plurality of materials.

In drawing a pixel, when an index of a material different from a material to be referred exists in an index of a block neighborhood to the pixel, some artifices are needed. One of the artifices is shown in FIG. 33. In FIG. 33, indexes of materials 1 and 2 are drawn in a block neighborhood to a pixel to be drawn.

According to the control image, two materials 1 and 2 must be referred to. When referring to the material 1, there is carried out a process to temporarily replace the part that an index of the material 2 of the neighborhood block is drawn with an index of the material 1. When the replacement is executed, it may be replaced with an index of the material 1 with highest similarity or may be replaced randomly.

Alternatively, the multi-dimensional pixel data of different materials in the codebook are compared with each other by using the index as it is without doing such a replacement process. The evaluation can be carried out by means of SAD. When referring to the material 2, the similar method can be applied. After having extracted, referring to the materials 1 and 2, an optimum pixel corresponding to each of the materials, weighting of an error or selection due to selection probability and so on is carried out. When referring to materials more than three kinds, the similar method is applied.

In this case, it is not necessary to scan the new index image simply from end to end thereof. For example, it is possible to searches for at first a pixel which refers to only one material surely by a similar pixel search, and then draw a pixel which must refer to a plurality of materials. In this approach, control becomes difficult. However, it is possible to use a pixel which has been drawn surely by reference of one material as one part of a neighborhood block. Therefore, it is possible to generate a texture which is near to a user's request by a few scans.

In addition, if a user can give a control factor whenever a new index image is drawn by one scanning, an interactive synthesis can be realized.

Generation (204) of texture image by the texture image generator 1606 is the same as that of the new texture image converter described by the previous embodiment. The present embodiment extracts a multi-dimensional texture from the multi-dimensional texture data storage unit 1602 and derives a multi-dimensional texture of a plurality of materials to generate a texture image with a variation is different. This differs from the previous embodiment.

The texture image generator 1606 extracts a multi-dimensional texture from the multi-dimensional texture data storage unit 1602 and provides a view point and light source condition of the texture image to be generated. The codebook is referred to on the basis of an index in an index image every pixel, and color information of a specified view point and light source condition is derived to draw a texture image. After all pixels were drawn, a texture image set is output.

The output texture image set can be applied to texture mapping for a three-dimensional object. A relation between a normal of each polygon of the three-dimensional object and a view point direction and a light source direction may be computed, and a texture image which is nearest to a corresponding view point and light source may be mapped. A more realistic image can be generated by interpolating using a plurality of texture images. However, it is not necessary to always generate the texture image to draw a pixel in a polygon unit. The drawing can be carried out while extracting color information of the pixel from the multi-dimensional texture. A memory can be effectively utilized by texture-mapping using the multi-dimensional texture.

Further, a user can use specific multi-dimensional texture data, and process and store the same by publicly opening on a network data of the multi-dimensional texture data storage unit 1602 as database. A group of textures that a certain user acquired or created is converted into a format of multi-dimensional texture data and publicly opened. Then, another user can synthesizes index image using the multi-dimensional texture data, and apply to texture mapping. Further, another user can reuse the multi-dimensional texture data by publicly opening on a network the multi-dimensional texture data subjected to the index image synthesis.

(Fifth Embodiment)

Figure 34:
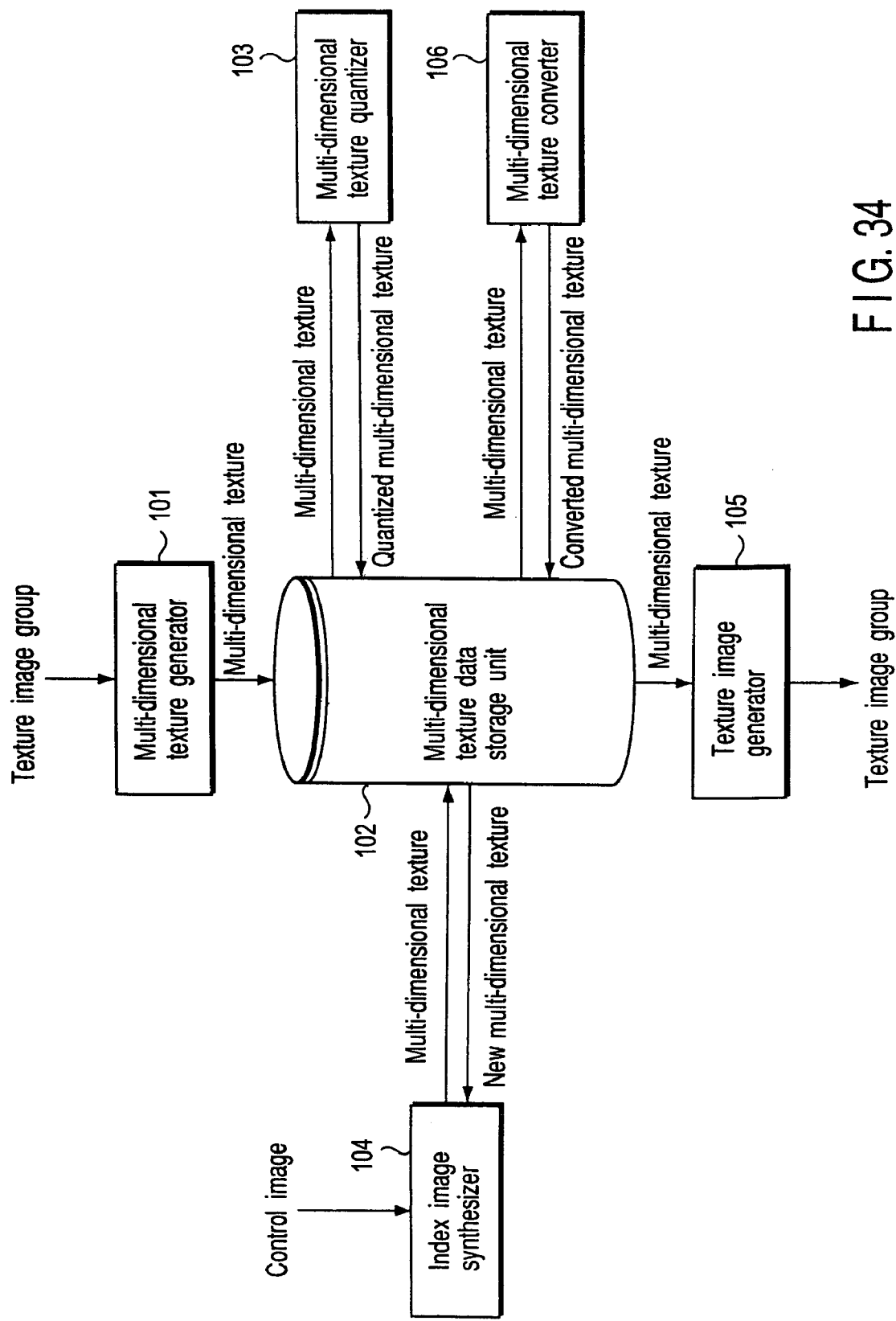
FIG. 34 shows a block diagram of a multi-dimensional texture synthesis apparatus having a multi-dimensional texture converter according to the fifth embodiment of the present invention.
Figure 35:
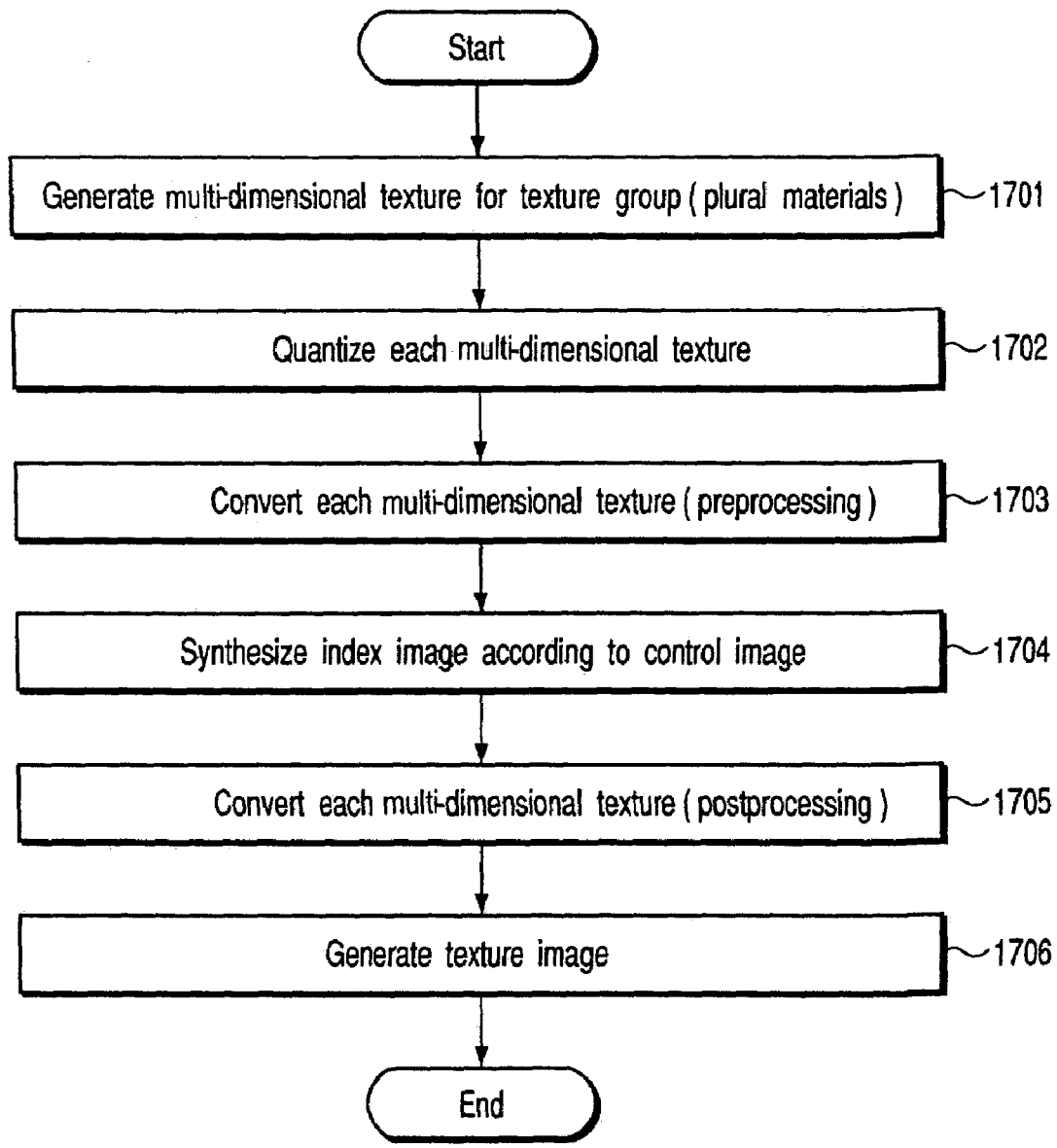
FIG. 35 shows a process flow of a multi-dimensional texture synthesis apparatus according to FIG. 34.

A multi-dimensional texture synthesis apparatus according to the present embodiment shown in FIG. 34 adds a multi-dimensional texture converter 1605 to the multi-dimensional texture synthesis apparatus (FIG. 20) of the first embodiment. In the embodiment, like reference numerals are used to designate like structural elements corresponding to those n the embodiment of FIG. 20 and any further explanation is omitted for brevity's sake. An operation of the multi-dimensional texture synthesis apparatus of the present embodiment will be described referring to FIG. 35. In step 1701, a multi-dimensional texture generator 1601 generates a multi-dimensional texture based on a group of input texture images. In step 1702, the multi-dimensional texture quantizer 1603 quantizes each multi-dimensional texture according to the same procedure as the first embodiment. In step 1703, as a preprocessing of a synthesis (step 1704) of an index image according to the control image, a multi-dimensional texture converter 1605 extracts a multi-dimensional texture from a multi-dimensional texture data storage unit 1602. Then, the multi-dimensional texture converter 1605 subjects the multi-dimensional pixel data to a blending process and a filtering process. The processed multi-dimensional texture is stored in the multi-dimensional texture data storage unit 1602.

Figure 36:
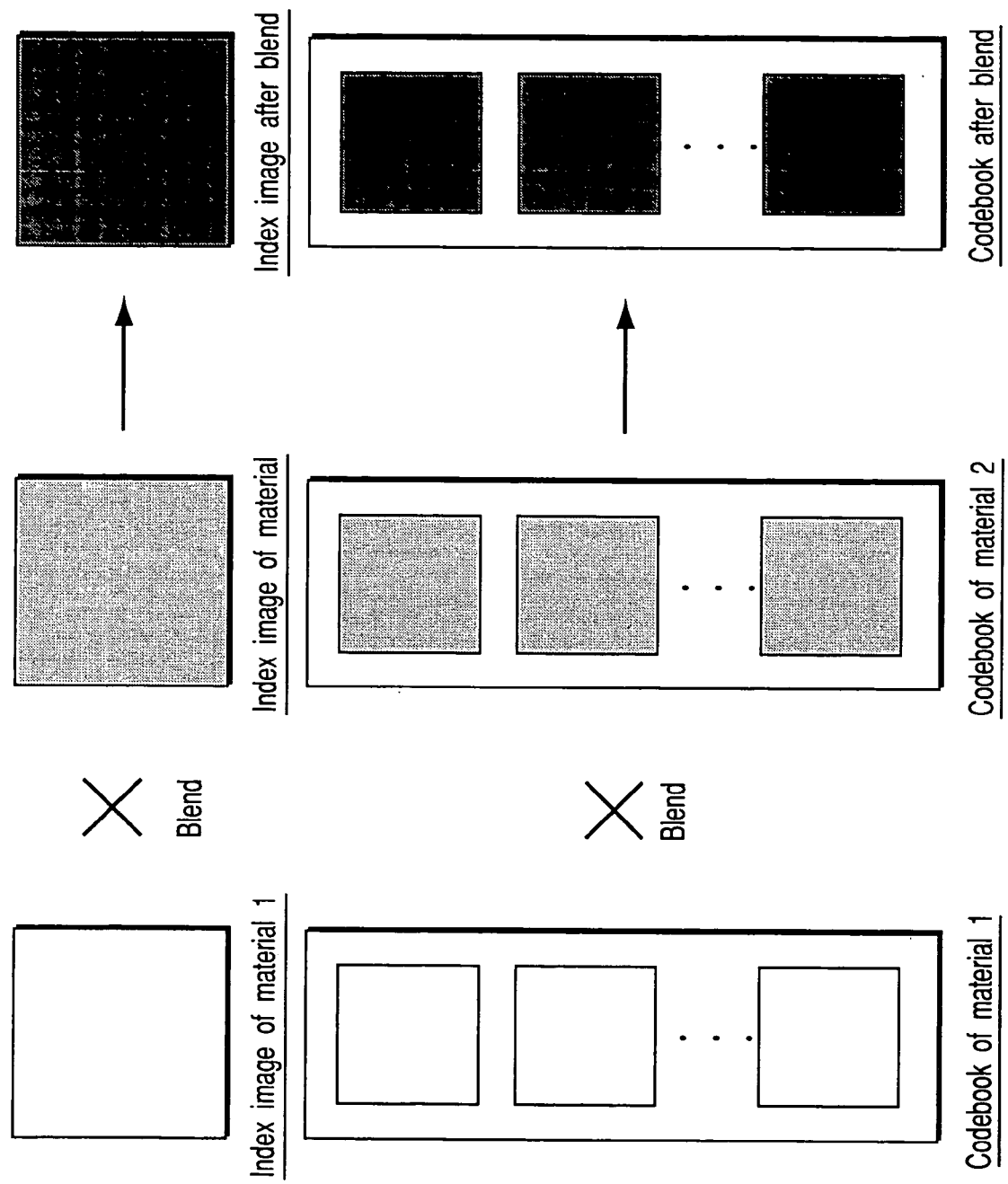
FIG. 36 is a diagram showing an example of a blending process of a plurality of materials.

An example of the blending process is shown in FIG. 36. For example, when two kinds of multi-dimensional textures are blended, the multi-dimensional textures of materials 1 and 2 are input to the multi-dimensional texture converter 1605 to compare two index images. New multi-dimensional pixel data are generated by calculating an average of multi-dimensional pixel data of material 1 designated by an index in the same pixel position and multi-dimensional pixel data of material 2 or adding two multi-dimensional pixel data based on a blend rate. The new multi-dimensional pixel data is registered in a new codebook, and an index image is generated newly. Such a process can generate an intermediate image in carrying out morphing between materials 1 and 2. The similar process can do for materials more than three kinds.

Various filtering processes such as changing of luminance or changing of transmittance are subjected to the multi-dimensional texture of one material, and to specific pixel or all pixels or specific or all view points/source positions. It is possible by this filtering process to obtain texture image subjected to multi-dimensional image processing without captured or drawn texture image itself, and further to give a special effect to the texture image. It is possible to provide an effect that a kind of an irradiated light source changes according to a position of the texture or an effect such as fades of a material and expansion and contraction of the material.

Figure 37:
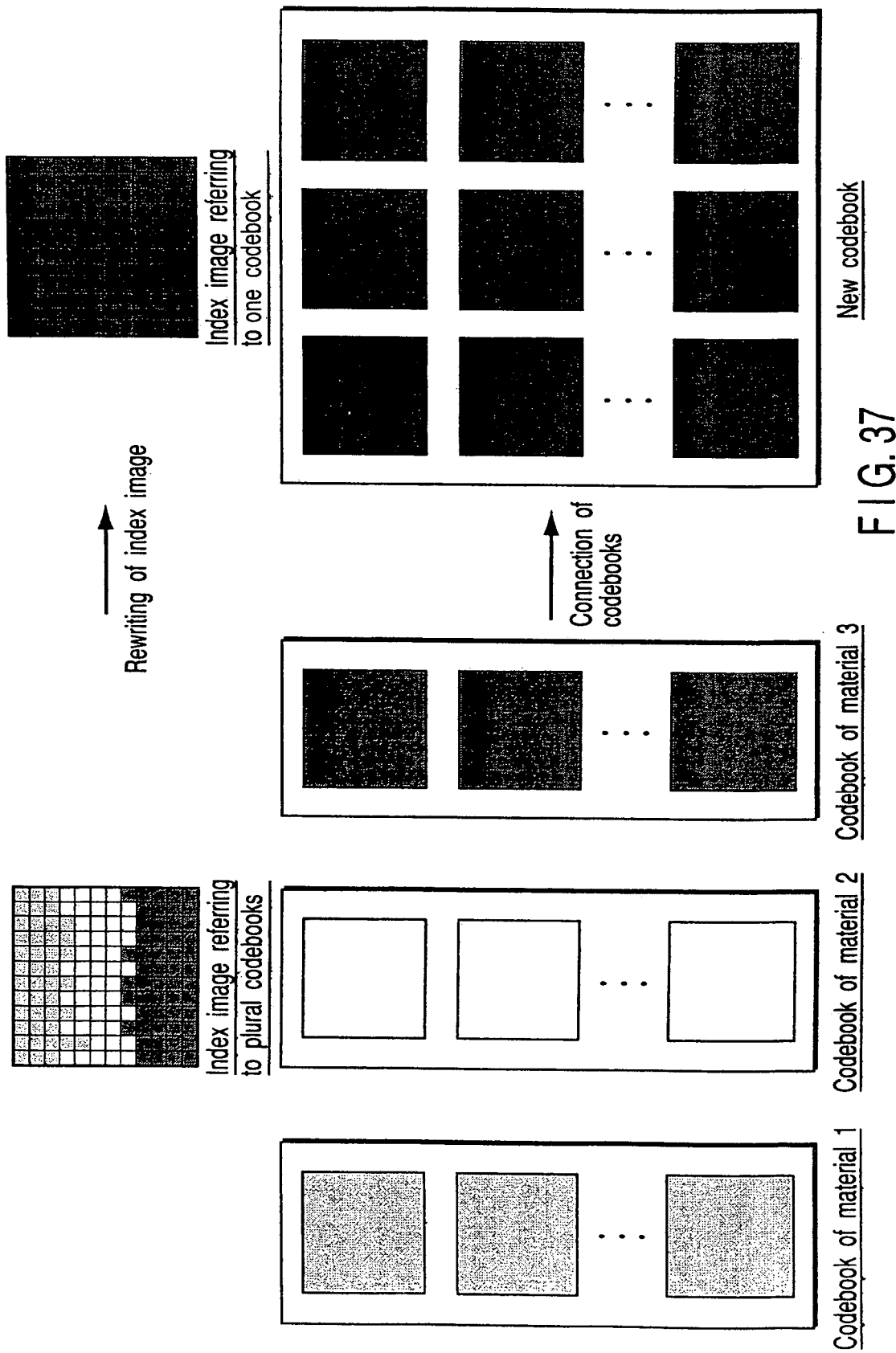

When a plurality of codebooks are referred to by a certain index image as shown in FIG. 37, it is possible to carry out a process to bring together the codebooks. In FIG. 37, since an input index image refers to the codebook of materials 1, 2 and 3, a plurality of materials ID and address information of the codebook are included in an index. Therefore, administration and operation are difficult. Consequently, the multi-dimensional pixel data in referring is brought together to one codebook to generate an index image newly. This makes it possible to recycle the index image as a new material in the index synthesis apparatus and generate easily a texture image in the texture image generator 1606.

The multi-dimensional texture conversion processing described above can use for a preprocessing (step 1703) or a post processing (1705) of a synthesis process of index image in the index image composition unit 1604, resulting in permitting to process the multi-dimensional texture with freedom. Generation (1706) of texture image by the texture image generator 1606 is the same as that of the new texture image converter describer by the previous embodiment.

According to an embodiment of the present invention as mentioned above, the use of a texture image varying with conditions such as view point direction or light source direction permits synthesizing of a new texture image of an arbitrary size while taking control from a user. According to the apparatus of the first embodiment, a multi-dimensional texture having an arbitrary pattern or a design can be synthesized using the multi-dimensional textures of a plurality of materials. According to the apparatus of the second embodiment, an intermediate image of morphing or a multi-dimensional texture with a special effect can be synthesized by a blending process of multi-dimensional pixel data or a filtering processes.

In addition, the multi-dimensional texture acquired or made once or the multi-dimensional texture quantized, synthesized and converted with this apparatus can be reused by storing a plurality of multi-dimensional texture in the data storage unit. In other words, it is possible to generate various multi-dimensional textures in good efficiency.

According to the embodiment of the present invention as mentioned above, synthesizing a new texture image of an arbitrary size can be carried out using the texture image varying by a condition such as a viewpoint direction or a light source direction.

According to the apparatus described in the first embodiment, the image obtained by reproducing a characteristic of the reference texture image as it is can be synthesized.

According to the apparatus described in the second embodiment, a pattern or a design similar to the target texture image is maintained, and it is possible to synthesize such a new texture image as to reproduce the characteristic of the reference texture image.

According to the apparatus described in the third embodiment, the computation using the multi-dimensional pixel data can be omitted as much as possible. As a result, the third embodiment is effective in a data amount and a computation time, and can maintain synthesis precision.

According to data structure of the multi-dimensional texture, the multi-dimensional texture image data can be effectively held, so that effective texture mapping can be realized.

It is possible to use multimedia data such as one or more images, pictures, speeches that are captured or drawn with a plurality of different conditions and apply the present invention to an apparatus to synthesize multimedia data of an arbitrary size or an arbitrary time length corresponding to each of the conditions.

According to the present invention, there can be provided a multi-dimensional texture synthesis apparatus and method that can effectively synthesize from a large quantity of texture image data a texture image of an arbitrary size which can express realistically the optical characteristic of an object surface varying according to a viewpoint direction and a light source direction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-dimensional texture synthesis apparatus to synthesize a new multi-dimensional texture using one or more texture images, comprising:

a reference multi-dimensional texture generator receiving, as one or more reference texture images, one or more texture images captured or created with a plurality of different conditions to generate a reference multi-dimensional texture including a codebook and a reference index image, the codebook including a set of color information of same-position pixels of one or more reference texture images, and the reference index image including a set of indexes for addressing the codebook;

a reference multi-dimensional texture quantizer to quantize the reference multi-dimensional texture at one or more quantization levels and generate a quantized codebook and a quantized reference index image;

an index image synthesizer to synthesize a new index image having a specified size from the quantized reference index image using a hierarchical structure of the reference multi-dimensional texture corresponding to one of the quantization levels;

a new multi-dimensional texture generator to generate a new multi-dimensional texture by combining the new index image with the quantized codebook; and a target multi-dimensional texture generator to generate a target multi-dimensional texture including a set of color information of the same-position pixels by receiving one or more texture images as one or more target texture images, and a target index image generator to generate a target index image by quantizing the target multi-dimensional texture using the codebook, and wherein the index image synthesizer uses the target index image, and the target index image generator includes:

means for inputting one or more codebooks and generating the target multi-dimensional texture at one or more quantization levels, means for replacing the codebook of the target multi-dimensional texture with the codebook input from the reference multi-dimensional texture quantizer, means for changing an index of each pixel of the target multi-dimensional texture to an index of the codebook containing multi-dimensional pixel data of highest similarity obtained by comparison between the target multi-dimensional pixel data generated by the means for generating the target multi-dimensional texture and the reference multi-dimensional pixel data in the codebook, and means for outputting an image obtained by changing indexes of all pixels as the target index image.

2. The multi-dimensional texture synthesis apparatus according to claim 1, wherein the reference multi-dimensional texture generator generates the reference index image by extracting the color information items of the same-position pixels from all the reference texture images, arranging the color information in a given format to generate multi-dimensional pixel data, storing the multi-dimensional pixel data in the codebook, and assigning indexes to the pixels.

3. The multi-dimensional texture synthesis apparatus according to claim 1, wherein the reference multi-dimensional texture quantizer quantizes the reference multi-dimensional texture corresponding to the one or more quantization levels by subjecting the reference multi-dimensional texture to vector quantization at the quantization level determined dependent upon a size of the codebook.

4. The multi-dimensional texture synthesis apparatus according to claim 3, wherein the vector quantization is a full search vector quantization including a process for fixing a cluster of error to 0.

5. The multi-dimensional texture synthesis apparatus according to claim 3, wherein the vector quantization is a tree-structured vector quantization including a process for searching for similarity of the multi-dimensional pixel data according to a tree structure configuring the codebook.

6. The multi-dimensional texture synthesis apparatus according to claim 1, wherein the index image includes a plurality of blocks each having a specified size, and the index image synthesizer inputs the reference multi-dimensional texture quantized at one of the quantization levels, and includes means for synthesizing a new index image by scanning a noise image randomly including the indexes contained in the reference index image to rewrite the indexes of the noise image for each of the blocks by using a similar pixel search searching the reference index image for a block having a highest similarity with respect to a rewritten block adjacent to a to-be-rewritten block of the noise image.

7. The multi-dimensional texture synthesis apparatus according to claim 6, wherein the index image synthesizer uses one of SAD (Sum of Absolute Difference), a correlation value and an inner product to obtain an evaluation value of the similarity of the multi-dimensional pixel data in the similar pixel search.

8. The multi-dimensional texture synthesis apparatus according to claim 6, wherein the index image synthesizer includes means for evaluating the similarity of the multi-dimensional pixel data in the similar pixel search by using output data of the multi-dimensional texture quantizer carrying out a tree structure vector quantization and tracing a tree of the codebook of a tree-structure, and the means for evaluating the similarity includes means for evaluating the similarity by means of the same tree-structure for the index image synthesis of each of a plurality of hierarchies.

9. The multi-dimensional texture synthesis apparatus according to claim 1, wherein the index image synthesizer evaluates, in a similar pixel search, the similarity of the block of the reference index image with respect to a rewritten block between the new index image generated at a hierarchy before the hierarchy of the reference multi-dimensional texture and the reference index image to obtain a last evaluation value.

10. The multi-dimensional texture synthesis apparatus according to claim 1, wherein the index image synthesizer carries out a similar pixel search using a reference index image of a lower hierarchy than the reference index image, and determining as an approximate evaluation value a quantization error in the hierarchy where the index of a neighborhood block coincides with that of the reference index image of the lower hierarchy for a first time.

11. The multi-dimensional texture synthesis apparatus according to claim 1, wherein the target multi-dimensional texture generator includes:

means for generating the target multi-dimensional texture image by extracting the color information of the same-position pixels from all of the one or more target texture images, means for arranging the color information in a format to generate multi-dimensional pixel data, means for storing the generated multi-dimensional pixel data in the codebook, means for providing an address of the codebook as an index information item of a pixel, and means for assigning a set of index information to the pixels to generate the target multi-dimensional texture image.

12. The multi-dimensional texture synthesis apparatus according to claim 1, which includes means for determining an evaluation value of similarity between a first block and a second block, the first block being a block of the target index image that is at the same position as that of a block that fails to be rewritten in blocks adjacent to a block to be written, and the second block being a block having the same shape as the first block in the reference index image.

13. The multi-dimensional texture synthesis apparatus according to claim 1, wherein the index image synthesizer includes:

means for receiving reference multi-dimensional textures quantized at two or more quantization levels from the reference multi-dimensional texture quantizer, means for generating new index images of plural sizes using hierarchies according to the quantization levels, and means for using a reference index image of lower hierarchy than the reference index image used for synthesis of the new index images in a similar pixel search to determine as an approximation evaluation value a quantization error of the hierarchy where an index of the neighborhood block coincides with that of the lower hierarchy reference index image for the first time.

14. The multi-dimensional texture synthesis apparatus according to claim 1, wherein the new multi-dimensional texture generator includes means for rewriting the new index image in conformity with the quantization level of the codebook when combining the new index image synthesized at a quantization level with the codebook of the quantization level.

15. The multi-dimensional texture synthesis apparatus according to claim 1, which further comprises a new texture image converter to convert the new multi-dimensional texture to one or more new texture images corresponding to a specific acquisition condition or a generation condition.

16. The multi-dimensional texture synthesis apparatus according to claim 15, wherein the new texture image converter includes means for reading high dimension pixel data from the codebook based on an index stored in each pixel of the new index image, and means for extracting color information corresponding to the specific acquisition condition or the generation condition from the multi-dimensional pixel data.

17. The multi-dimensional texture synthesis apparatus according to claim 1, which further comprises a database to store the multi-dimensional texture data publicly on a network.

* * * * *